US012195584B2

(12) United States Patent
Tojo et al.

(10) Patent No.: US 12,195,584 B2
(45) Date of Patent: Jan. 14, 2025

(54) THERMOPLASTIC POLYESTER RESIN, THERMOPLASTIC POLYESTER RESIN COMPOSITION AND MOLDED ARTICLE

(71) Applicant: Toray Industries, Inc., Tokyo (JP)

(72) Inventors: Yusuke Tojo, Nagoya (JP); Kohei Miyamoto, Nagoya (JP); Makito Yokoe, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 221 days.

(21) Appl. No.: 17/629,063

(22) PCT Filed: Jul. 20, 2020

(86) PCT No.: PCT/JP2020/028092
§ 371 (c)(1),
(2) Date: Jan. 21, 2022

(87) PCT Pub. No.: WO2021/020208
PCT Pub. Date: Feb. 4, 2021

(65) Prior Publication Data
US 2022/0275149 A1    Sep. 1, 2022

(30) Foreign Application Priority Data

Jul. 31, 2019 (JP) .................. 2019-140544
Dec. 25, 2019 (JP) .................. 2019-234367
Mar. 26, 2020 (JP) .................. 2020-055299

(51) Int. Cl.
| | |
|---|---|
| C08G 63/181 | (2006.01) |
| B32B 15/09 | (2006.01) |
| B32B 27/36 | (2006.01) |
| C08G 63/123 | (2006.01) |
| C08G 63/127 | (2006.01) |
| C08G 63/183 | (2006.01) |
| C08G 63/50 | (2006.01) |
| C08G 63/91 | (2006.01) |
| C08K 3/013 | (2018.01) |
| C08L 63/00 | (2006.01) |
| C08L 67/02 | (2006.01) |
| C08K 7/14 | (2006.01) |
| C08L 23/06 | (2006.01) |
| C08L 25/06 | (2006.01) |
| C08L 69/00 | (2006.01) |

(52) U.S. Cl.
CPC ............ *C08G 63/181* (2013.01); *B32B 15/09* (2013.01); *C08G 63/50* (2013.01); *C08L 67/02* (2013.01); *B32B 27/36* (2013.01); *B32B 2307/20* (2013.01); *B32B 2311/00* (2013.01); *B32B 2367/00* (2013.01); *B32B 2457/00* (2013.01); *C08G 63/123* (2013.01); *C08G 63/127* (2013.01); *C08G 63/183* (2013.01); *C08G 63/916* (2013.01); *C08K 3/013* (2018.01); *C08L 63/00* (2013.01)

(58) Field of Classification Search
None
See application file for complete search history.

(56) References Cited

U.S. PATENT DOCUMENTS

| | | | | |
|---|---|---|---|---|
| 11,939,466 | B2 * | 3/2024 | Miyamoto | ............ B32B 27/36 |
| 2015/0376447 | A1 | 12/2015 | Kawabe et al. | |
| 2016/0369088 | A1 * | 12/2016 | Alidedeoglu | ........ C08G 63/183 |
| 2021/0130607 | A1 * | 5/2021 | Cho | ......................... G01S 7/02 |
| 2021/0332230 | A1 * | 10/2021 | Cho | ......................... H01Q 1/42 |
| 2021/0332231 | A1 * | 10/2021 | Miyamoto | ............ B32B 15/09 |
| 2022/0389156 | A1 * | 12/2022 | Duncan | ................. C08G 63/16 |
| 2023/0257515 | A1 * | 8/2023 | Sakai | ..................... C08L 79/08 |
| | | | | 524/599 |

FOREIGN PATENT DOCUMENTS

| | | |
|---|---|---|
| JP | 01-234419 A | 9/1989 |
| JP | 02-97523 A | 4/1990 |
| JP | 06-9858 A | 1/1994 |
| JP | 07-126364 A | 5/1995 |
| JP | 09-255856 A | 9/1997 |
| JP | 10-310638 A | 11/1998 |
| JP | 2000-319372 | 11/2000 |
| JP | 2003-292601 A * | 10/2003 |
| JP | 2005-275390 A | 10/2005 |
| JP | 4092756 B2 * | 5/2008 |
| JP | 2013-131576 A | 7/2013 |
| JP | 2014-129513 A | 7/2014 |
| JP | 2016-027132 A | 2/2016 |

* cited by examiner

*Primary Examiner* — Vivian Chen
(74) *Attorney, Agent, or Firm* — DLA Piper LLP (US)

(57) ABSTRACT

A thermoplastic polyester resin includes a residue of an aromatic dicarboxylic acid or an ester-forming derivative thereof and a residue of a diol or an ester-forming derivative thereof, as main structural units, wherein the thermoplastic polyester resin has a hydroxy group concentration of 0.050 mmol/g or less. The use of such a thermoplastic polyester resin enables production of a molded article having excellent mechanical properties and heat resistance, and a reduced dielectric loss tangent at a high frequency of 1 GHz or more.

17 Claims, No Drawings

THERMOPLASTIC POLYESTER RESIN, THERMOPLASTIC POLYESTER RESIN COMPOSITION AND MOLDED ARTICLE

TECHNICAL FIELD

This disclosure relates to a thermoplastic polyester resin, a thermoplastic polyester resin composition, and a molded article obtained by molding the same.

BACKGROUND

Thermoplastic polyester resins have been used in a wide range of fields, for example, in mechanical machine parts, electric and electronic components and automotive parts, utilizing their excellent properties such as injection molding properties and mechanical properties.

Further, based on a high-speed communication standard utilizing a high frequency of 1 GHz or more, which is a new communication frequency band, the development of high frequency-compatible products such as communication equipment capable of being operated at high frequencies and millimeter wave sensors for use in automobiles, have been actively performed, in recent years, aiming to realize next-generation services such as large-capacity high-speed communication and self-driving.

Because of the characteristic that electromagnetic waves of a frequency of 1 GHz or more easily attenuate, it has been a challenge, in high frequency-compatible products, to achieve a material design which enables to reduce the absorption loss of electromagnetic waves as much as possible, in high-frequency transmission parts such as covers and radomes, included in the products, to improve the communication distance and accuracy.

For example, when a material having high dielectric properties (dielectric loss tangent) comes into contact with a high frequency signal, the high frequency is converted to heat due to dielectric loss, which causes problems of a decrease in signal intensity and a decrease in communication accuracy such as communication distance. Therefore, an improvement in the dielectric properties of the material in the high frequency band has been demanded.

To improve the dielectric properties of a thermoplastic polyester resin composition, there has been disclosed a method in which a low dielectric polyester resin obtained by copolymerizing an acid component containing terephthalic acid and/or a terephthalic acid derivative and a diol component containing 2,2-alkyl-substituted-1,3-propanediol, and having an intrinsic viscosity of from 0.3 to 1.2 dl/g (JP 7-126364 A) is used, and a method in which a polyolefin resin with excellent low dielectric properties, or the like, is used in combination, as in a polybutylene terephthalate resin composition in which an olefin resin (B) and a fibrous inorganic filler (C) are contained in combination with a polybutylene terephthalate resin (A) (JP 2013-131576 A).

However, while the disclosure in JP 7-126364 A provides the effect of reducing the relative dielectric constant in a low frequency band of 1 MHz or less, there has been a problem of failing to achieve a sufficient dielectric loss tangent in the high frequency band.

Further, while the dielectric loss tangent in the high frequency band is reduced in the disclosure in JP 2013-131576 A, due to containing a large amount of an olefin resin having a low dielectric loss tangent, there has been a problem of failing to achieve a sufficient stiffness and heat resistance of the resulting molded article.

It could, therefore, be helpful to provide a molded article having excellent mechanical properties and heat resistance, and also having a low dielectric loss tangent in a high frequency band of 1 GHz or more.

SUMMARY

We found that the dielectric loss tangent at a high frequency correlates with the energy loss due to the local movement of molecules. As a result, we discovered that the above-mentioned problems can be solved by reducing the hydroxy group concentration, in a thermoplastic polyester resin comprising a residue of an aromatic dicarboxylic acid or an ester-forming derivative thereof and a residue of an aliphatic diol or an ester-forming derivative thereof, as main structural units, to a value equal to or less than a specific amount, as the design of the polymer.

We thus provide:

A thermoplastic polyester resin comprising a residue of an aromatic dicarboxylic acid or an ester-forming derivative thereof and a residue of a diol or an ester-forming derivative thereof, as main structural units, wherein the hydroxy group concentration determined from the integral ratio of the peaks attributed to the end groups, as measured by $^1$H-NMR using heavy hexafluoroisopropanol as a solvent, is 0.050 mmol/g or less, and wherein the dielectric loss tangent at 5.8 GHz, as measured by the cylindrical cavity resonator perturbation method at 23° C., is 0.0060 or less.

A method of producing the thermoplastic polyester resin described above, the method including adding an aliphatic alcohol having 10 to 50 carbon atoms, in the step of any one reaction selected from the group consisting of an esterification reaction, a transesterification reaction and a polycondensation reaction, of the aromatic dicarboxylic acid or an ester-forming derivative thereof and the diol or an ester-forming derivative thereof, in the polymerization step of the thermoplastic polyester resin.

A thermoplastic polyester resin composition comprising:
the thermoplastic polyester resin described above; and
from 10 to 150 parts by weight of a thermoplastic resin (B) having a dielectric loss tangent at a frequency of 5.8 GHz, as measured by the cylindrical cavity resonator perturbation method, of 0.005 or less, with respect to 100 parts by weight of the thermoplastic polyester resin.

A molded article obtained by melt molding the thermoplastic polyester resin described above, or the thermoplastic polyester resin composition described above.

According to the thermoplastic polyester resin composition, it is possible to obtain a molded article having excellent mechanical properties and heat resistance, and also having a low dielectric loss tangent in a high frequency band of 1 GHz or more.

DETAILED DESCRIPTION

The thermoplastic polyester resin will now be described in detail.

The thermoplastic polyester resin is a thermoplastic polyester resin comprising a residue of an aromatic dicarboxylic acid or an ester-forming derivative thereof and a residue of a diol or an ester-forming derivative thereof, as main structural units, wherein the hydroxy group concentration is 0.050 mmol/g or less, and wherein the dielectric loss tangent at 5.8 GHz, as measured by the cylindrical cavity resonator perturbation method at 23° C., is 0.0060 or less.

We found that the dielectric loss of a thermoplastic polyester resin at a high frequency of 1 GHz or more is derived from a specific molecular structure. In particular, we discovered that decreasing the amount of hydroxy groups derived from a diol present at the end of the polymer leads to a reduced movement of the polymer end, thereby enabling to reduce the dielectric loss tangent.

The thermoplastic polyester resin is a polymer comprising a residue of an aromatic dicarboxylic acid or an ester-forming derivative thereof and a residue of a diol or an ester-forming derivative thereof, as main structural units. The expression "comprising as main structural units" refers to comprising the above-described residues in an amount of 50% by mole or more with respect to the total structural units. Preferably, the thermoplastic polyester resin contains 80% by mole or more of these residues. The thermoplastic polyester resin may be a copolymer.

Examples of the aromatic dicarboxylic acid or an ester-forming derivative thereof include: aromatic dicarboxylic acids such as terephthalic acid, isophthalic acid, phthalic acid, 2,6-naphthalenedicarboxylic acid, 1,5-naphthalenedicarboxylic acid, bis(p-carboxyphenyl)methane, anthracenedicarboxylic acid, 4,4'-diphenyl ether dicarboxylic acid, 5-tetrabutylphosphonium isophthalic acid and 5-sodium sulfoisophthalic acid; and ester-forming derivatives thereof. Two or more kinds of these compounds may be used.

Further, examples of the diol or an ester-forming derivative thereof include: aliphatic and alicyclic glycols having from 2 to 20 carbon atoms such as ethylene glycol, 1,3-propylene glycol, 1,4-butanediol, neopentyl glycol, 1,5-pentanediol, 1,6-hexandiol, decamethylene glycol, cyclohexanedimethanol, cyclohexanediol and dimer diol; and ester-forming derivatives thereof. Two or more kinds these compounds may be used.

Examples of the polymer or copolymer comprising an aromatic dicarboxylic acid or an ester-forming derivative thereof and a diol or an ester-forming derivative thereof, as structural units, include aromatic polyester resins such as polyethylene terephthalate, polypropylene terephthalate, polybutylene terephthalate, polybutylene naphthalate, polypropylene isophthalate/terephthalate, polybutylene isophthalate/terephthalate, polypropylene terephthalate/naphthalate, polybutylene terephthalate/naphthalate, polypropylene terephthalate/5-sodium sulfoisophthalate and polybutylene terephthalate/5-sodium sulfoisophthalate. The compounds expressed using "/" as used herein represent copolymers.

Among these, a polymer comprising a residue of an aromatic dicarboxylic acid or an ester-forming derivative thereof and a residue of an aliphatic diol or an ester-forming derivative thereof, as main structural units, is preferred, from the viewpoint of further improving the mechanical properties and the heat resistance. A polymer comprising at least one residue selected from the residues of terephthalic acid, naphthalenedicarboxylic acid and ester-forming derivatives thereof, and at least one residue selected from the residues of ethylene glycol, 1,3-propylene glycol, 1,4-butanediol and ester-forming derivatives thereof, as main structural units, is more preferred.

In particular, aromatic polyester resins such as polyethylene terephthalate, polypropylene terephthalate, polybutylene terephthalate, polyethylene naphthalate, polypropylene naphthalate, polybutylene naphthalate, polypropylene isophthalate/terephthalate, polybutylene isophthalate/terephthalate, polypropylene terephthalate/naphthalate and polybutylene terephthalate/naphthalate are particularly preferred. Polybutylene terephthalate, polybutylene isophthalate/terephthalate and polybutylene naphthalate are more preferred, and polybutylene terephthalate is still more preferred because of its excellent moldability and crystallinity. Further, two or more kinds of these resins can be mixed at arbitrary contents and used.

The proportion of the residue of terephthalic acid or an ester-forming derivative thereof with respect to the total dicarboxylic acid residues included in the above-described thermoplastic polyester resin is preferably 30 mol % or more, and more preferably 40 mol % or more. The proportion described above is preferably 50 mol % or more, more preferably 60 mol % or more, and still preferably 70 mol % or more, because it allows for improving the heat resistance.

The proportion of the residue of isophthalic acid or 2,6-naphthalenedicarboxylic acid or an ester-forming derivative thereof with respect to the total dicarboxylic acid residues included in the above-described thermoplastic polyester resin is preferably 3 mol % or more, because it is possible to reduce the dielectric loss due to the structure derived from terephthalic acid and to achieve a decrease in the dielectric loss tangent. The proportion described above is more preferably 5 mol % or more, and still more preferably 10 mol % or more. Further, the proportion described above is preferably 50 mol % or less, more preferably 40 mol % or less, and still more preferably 30 mol % or less, because a decrease in the heat resistance and an increase in the cost can be reduced.

In the thermoplastic polyester resin, the hydroxy group concentration is 0.050 mmol/g or less. The hydroxy group concentration in the thermoplastic polyester resin is more preferably 0.040 mmol/g or less, still more preferably 0.030 mmol/g or less, and yet still more preferably 0.020 mmol/g or less, because the dielectric loss tangent can further be reduced. The lower limit of the hydroxy group concentration is 0 mmol/g. The hydroxy group concentration in the thermoplastic polyester resin is a value determined from the integral ratio of the peaks attributed to the end groups, as measured by $^1$H-NMR using heavy hexafluoroisopropanol as a solvent.

Further, the hydroxy group concentration can also be determined, as described in JP 6-9858 A, by calculating the total amount of end groups from the intrinsic viscosity, and subtracting the amount of carboxyl end groups determined by the titration method from the total amount of end groups. However, the value of the amount of end groups calculated from the intrinsic viscosity is inaccurate, and yields a value markedly lower compared to the hydroxy group concentration determined by $^1$H-NMR described above. This is due to the fact that the amount of end groups is estimated lower in the process of calculating the total amount of end groups from the intrinsic viscosity, and the determination by $^1$H-NMR allows for a more accurate quantification of the hydroxy group concentration. Therefore, to reduce the dielectric loss tangent, it is necessary to reduce the hydroxy group concentration determined by $^1$H-NMR to a value equal to or less than a specific amount, and the hydroxy group concentration is specified by the hydroxy group concentration determined by this measurement method.

In the thermoplastic polyester resin, the carboxylic acid group concentration is preferably 0.070 mmol/g or less, from the viewpoint of improving the flowability, hydrolysis resistance and heat resistance. The carboxylic acid group concentration in the thermoplastic polyester resin is preferably 0.060 mmol/g or less, and more preferably 0.50 mmol/g or less. The lower limit value of the carboxylic acid group concentration is 0 mmol/g. The carboxylic acid group concentration in the thermoplastic polyester resin as used herein refers to a value measured by dissolving the thermoplastic polyester resin in an o-cresol/chloroform solvent, followed by titration with ethanolic potassium hydroxide.

The thermoplastic polyester resin preferably has a melting point of 180° C. or higher. When the thermoplastic polyester resin has a melting point of 180° C. or higher, the heat resistance of the resulting thermoplastic polyester resin composition can be improved. The melting point of the thermoplastic polyester resin is preferably 190° C. or higher, and more preferably 200° C. or higher, from the viewpoint of improving the heat resistance. The melting point of the thermoplastic polyester resin is the value of the peak temperature of the endothermic melting peak, obtained when the resin is heated in DSC (differential scanning calorimetry) from 25° C. to 20° C./min.

The thermoplastic polyester resin preferably has a weight average molecular weight (Mw) of 8,000 or more, from the viewpoint of further improving the mechanical properties. The weight average molecular weight (Mw) of the thermoplastic polyester resin is more preferably 9,000 or more, and still more preferably 10,000 or more. Further, the weight average molecular weight (Mw) of the thermoplastic polyester resin is preferably 500,000 or less, because it leads to an improved flowability. The weight average molecular weight (Mw) is more preferably 300,000 or less, and still more preferably 250,000 or less. The weight average molecular weight (Mw) of the thermoplastic polyester resin is a value in terms of polymethyl methacrylate (PMMA), as measured by gel permeation chromatography (GPC) using hexafluoroisopropanol as a solvent.

The thermoplastic polyester resin preferably has an intrinsic viscosity (IV) of 0.6 dl/g or more, from the viewpoint of further improving the mechanical properties. The intrinsic viscosity of the thermoplastic polyester resin is more preferably 0.65 dl/g or more, and still more preferably 0.7 dl/g or more. Further, the intrinsic viscosity of the thermoplastic polyester resin is preferably 2 dl/g or less, because it leads to an improved flowability. The intrinsic viscosity is more preferably 1.7 dl/g or less, and still more preferably 1.4 dl/g or less. The intrinsic viscosity of the thermoplastic polyester resin is a value determined by measuring at 25° C., using ortho-chlorophenol as a solvent.

In the thermoplastic polyester resin, the dielectric loss tangent at 5.8 GHz, as measured by the cylindrical cavity resonator perturbation method at 23° C., is 0.0060 or less. When the dielectric loss tangent is 0.0060 or less, it is possible to reduce the dielectric loss and to reduce the degradation of high frequency signals, thereby enabling an excellent antenna gain, radar accuracy and the like. This makes the resin suitable for use in a high-frequency transmission part. The dielectric loss tangent is more preferably 0.0055 or less, and still more preferably 0.0050 or less.

In the thermoplastic polyester resin, the dielectric loss tangent at 68 GHz, as measured by the cut-off circular waveguide method at 23° C., is 0.0080 or less. When the dielectric loss tangent is 0.0080 or less, it is possible to reduce the dielectric loss in an even higher frequency band and reduce the degradation of high frequency signals, thereby enabling an excellent antenna gain, radar accuracy and the like. This makes the resin suitable for use in a high-frequency transmission part. The dielectric loss tangent is more preferably 0.0070 or less, and still more preferably 0.0060 or less.

The dielectric loss tangent of the thermoplastic polyester resin can be determined by the S-parameter method such as the free-space S-parameter method or the corrugated circular waveguide S-parameter method; or by the cavity resonance method such as the balanced circular disk resonator method, the Fabry-Perot open resonator method, the split cylinder resonator method, the split-post dielectric resonator method, the cylindrical cavity resonator perturbation method or the cut-off circular waveguide method. From the viewpoint of the accuracy of the measured value, however, the value determined by the cavity resonance method is defined as the dielectric loss tangent. Further, the value determined by the cylindrical cavity resonator perturbation method, of the cavity resonance methods, is defined as the dielectric loss tangent.

The thermoplastic polyester resin can be produced by: a method (production method by a polycondensation reaction) in which the amount of hydroxy groups is decreased while polymerizing the thermoplastic polyester resin by a known polycondensation method or ring-opening polymerization method; or a method in which the amount of hydroxy groups is decreased by the solid-state polymerization of the thermoplastic polyester resin (method by solid-state polymerization). The production method by a polycondensation reaction may be carried out either by batch polymerization or continuous polymerization, and may be carried out either by a transesterification reaction and a reaction by direct polymerization, or a reaction by direct polymerization. From the viewpoint of decreasing the amount of hydroxy groups, however, batch polymerization is preferred, and direct polymerization is more preferred.

In producing the thermoplastic polyester resin by the production method by a polycondensation reaction, the amount of hydroxy groups can be decreased by: subjecting an aromatic dicarboxylic acid or an ester-forming derivative thereof, and a diol or an ester-forming derivative thereof, to an esterification reaction or a transesterification reaction; and using a monofunctional alcohol, and using a compound (hydroxy group blocking agent) that reacts with hydroxy groups, in the subsequent polycondensation reaction process. These can be added at an arbitrary stage in the transesterification reaction or the polycondensation reaction. The details thereof will be described later.

It is preferred that an aliphatic group having from 10 to 50 carbon atoms have been introduced into a part of a molecular end of the thermoplastic polyester resin, because it allows for decreasing the dielectric loss tangent and improving the flowability.

The aliphatic group described above is a functional group containing a hydrocarbon composed of carbon atoms and hydrogen atoms as a main skeleton, and the structure thereof in which carbon atoms are connected in the form of a chain may have a linear or branched structure, or a cyclic structure. Examples of the aliphatic group described above include: linear saturated aliphatic groups such as decyl group (C10), undecyl group (C11), dodecyl group (C12), tridecyl group (C13), tetradecyl group (C14), pentadecyl group (C15), hexadecyl group (C16), heptadecyl group (C17), octadecyl group (C18), nonadecyl group (C19), icosyl group (C20), henicosyl group (C21), docosyl group (C22), tricosyl group (C23), tetracosyl group (C24), pentacosyl group (C25), hexacosyl group (C26), heptacosyl group (C27), octacosyl group (C28), triacontyl group (C30) and tetracontyl group (C40); branched saturated aliphatic groups such as butylhexyl group (C10), butyloctyl group (C12), hexyloctyl group (C14), hexyldecyl group (C16), octyldecyl group (C18), hexyldodecyl group (C18), trimethylbutyltrimethyloctyl group (C18), butyltetradecyl group (C18), hexyltetradecyl group (C20), octyltetradecyl group (C22), octylhexadecyl group (C24), decyltetradecyl group (C24), dodecyltetradecyl group (C26), dodecylhexadecyl group (C28), decyloctadecyl group (C28), tetradecyloctadecyl group (C32) and hexadecylicosasyl group (C36); and unsaturated aliphatic groups such as palmitoleyl group (C16), oleyl group (C18), linoleyl group (C18) and erucyl group (C22). The number described above after the letter "C" is the number of carbon atoms (also referred to as "carbon number"). Among these, the aliphatic group is preferably a linear or branched saturated aliphatic group from the viewpoint of improving the color, and more preferably a branched saturated aliphatic group from the viewpoint of improving the flowability. The carbon number of the aliphatic group is preferably 10 or more and 50 or less, because the effect of improving the flowability can be obtained. Further, the lower limit of the carbon number is preferably 16 or more, and more preferably 20 or more, because it allows for improving the flowability. The upper limit of the carbon number is preferably 36 or less, and more preferably 30 or less.

In the thermoplastic polyester resin, the functional group concentration of the aliphatic group present at the molecular end of the resin is preferably 0.005 mmol/g or more and less than 0.20 mmol/g. When the functional group concentration of the aliphatic group is 0.005 mmol/g or more, it allows for improvements in the flowability and the dielectric properties. The functional group concentration is more preferably 0.010 mmol/g or more, and sill more preferably 0.020 mmol/g or more. When the functional group concentration of the aliphatic group is less than 0.20 mmol/g, it allows for improvements in the mechanical properties and the heat resistance. The functional group concentration is more preferably less than 0.18 mmol/g, and still more preferably less than 0.15 mmol/g.

The functional group concentration of the aliphatic group present at the molecular end of the resin is a value determined from the integral ratio of the peaks attributed to the end groups, as measured by $^1$H-NMR using heavy hexafluoroisopropanol as a solvent.

The above-described aliphatic group having from 10 to 50 carbon atoms has been introduced into an end group of the thermoplastic polyester resin, by an arbitrary bond. For example, in a carboxyl end group derived from a dicarboxylic acid component, the aliphatic group is introduced into the end group by an ester bond, an amide bond or the like. In an alcohol end group derived from a diol component, the aliphatic group is introduced into the end group by an ester bond, an ether bond, a thioether bond, an urethane bond or the like. It is preferred that the aliphatic group have been introduced into the carboxyl end group of the thermoplastic polyester resin by an ester bond, because excellent dielectric properties can be obtained.

The thermoplastic polyester resin preferably has, as the aliphatic group, a structure derived from a branched saturated aliphatic alcohol having from 10 to 50 carbon atoms or an ester-forming derivative thereof. When the thermoplastic polyester resin has a structure derived from the above-described compound, the amount of molecular end hydroxy groups is decreased, and the resin has a low-polarity end group having a weak interaction with high frequency waves. This enables a reduction in the dielectric loss tangent of the resulting thermoplastic polyester resin and, therefore, is preferred.

The branched saturated aliphatic alcohol having from 10 to 50 carbon atoms or an ester-forming derivative thereof, is an alcohol containing a hydrocarbon composed of carbon atoms and hydrogen atoms as a main skeleton, or an ester-forming derivative thereof, and the structure thereof in which carbon atoms are connected in the form of a chain has a branched structure. Examples of the branched structure include the structures described above as the branched saturated aliphatic groups.

In the thermoplastic polyester resin, the ratio ((the molecular weight of the aliphatic group)/(the number average molecular weight of the thermoplastic polyester resin)) of the molecular weight of the aliphatic group to the number average molecular weight of the thermoplastic polyester resin is preferably 0.001 or more and 0.10 or less. When the ratio of the molecular weight of the aliphatic group to the number average molecular weight of the thermoplastic polyester resin is within the range described above, the effect of improving the heat resistance and the flowability can be obtained. The above-described ratio is preferably 0.007 or more and 0.05 or less, and more preferably 0.010 or more and 0.04 or less.

In producing the thermoplastic polyester resin by the production method by a polycondensation reaction, the resin can be produced by: subjecting an aromatic dicarboxylic acid or an ester-forming derivative thereof, and a diol or an ester-forming derivative thereof, to an esterification reaction or a transesterification reaction; and, in the subsequent polycondensation reaction process, adding an aliphatic alcohol having 10 to 50 carbon atoms, at an arbitrary stage in any one reaction selected from the group consisting of an esterification reaction, a transesterification reaction and a polycondensation reaction. In particular, the thermoplastic polyester resin is preferably produced by adding an aliphatic alcohol having 10 to 50 carbon atoms, at an arbitrary stage in either the esterification reaction or the transesterification reaction, because a resin having excellent dielectric properties can be obtained.

Further, in the thermoplastic polyester resin, the hydroxy group concentration in the thermoplastic polyester resin can be reduced by adding a compound (sometimes referred to as "hydroxy group blocking agent") that reacts with hydroxy groups, at an arbitrary stage in the transesterification reaction or the polycondensation reaction, in the production process of the thermoplastic polyester resin.

The hydroxy group blocking agent is a compound that reacts with hydroxy groups of a diol or an ester-forming derivative thereof, to reduce the hydroxy group concentration in the thermoplastic polyester resin. The hydroxy group blocking agent may be, for example, a monofunctional carboxylic acid, an acid anhydride, an isocyanate compound or the like.

Examples of the monofunctional carboxylic acid include: aliphatic carboxylic acids and alicyclic carboxylic acids having 1 to 50 carbon atoms such as acetic acid, propionic acid, butyric acid, valeric acid, caproic acid, enanthic acid, caprylic acid, stearic acid, oleic acid, linoleic acid and cyclohexane carboxylic acid; and aromatic carboxylic acids having 1 to 50 carbon atoms such as benzoic acid, toluic acid, naphthoic acid, anthracenecarboxylic acid, phenylbenzoic acid, chlorobenzoic acid, hydroxybenzoic acid and phthalic acid.

Examples of the acid anhydride include acid anhydrides obtained by dehydration condensation of the carboxylic acid compounds described above such as acetic anhydride and benzoic anhydride.

Examples of the isocyanate compound include compounds such as phenyl isocyanate, tolyl isocyanate, naphthyl isocyanate, phenylene diisocyanate, naphthalene diisocyanate, diphenylmethane diisocyanate, hexamethylene diisocyanate and toluene diisocyanate.

To allow the esterification reaction or the transesterification reaction and the polycondensation reaction of the thermoplastic polyester resin to proceed effectively, it is preferred to add a polymerization reaction catalyst during these reactions. Specific examples of the polymerization reaction catalyst include: organic titanium compounds such as the methyl ester, tetra-n-propyl ester, tetra-n-butyl ester, tetraisopropyl ester, tetraisobutyl ester, tetra-tert-butyl ester, cyclohexyl ester, phenyl ester, benzyl ester and tolyl ester, of titanic acid, and mixed esters thereof; tin compounds such as dibutyltin oxide, methylphenyltin oxide, tetraethyltin, hexaethylditin oxide, cyclohexahexylditin oxide, didodecyltin oxide, triethyltin hydroxide, triphenyltin hydroxide, triisobutyltin acetate, dibutyltin diacetate, diphenyltin dilaurate, monobutyltin trichloride, dibutyltin dichloride, tributyltin chloride, dibutyltin sulfide, butylhydroxytin oxide, alkylstannonic acids such as methylstannonic acid, ethylstannonic acid and butylstannonic acid; zirconia compounds such as zirconium tetra-n-butoxide; and antimony compounds such as antimony trioxide and antimony acetate. Two or more kinds of these compounds may be used.

Among these polymerization reaction catalysts, organic titanium compounds and tin compounds are preferred, and tetra-n-butyl ester of titanic acid is more preferred. The amount of the polymerization reaction catalyst to be added is preferably 0.01 to 0.2 parts by weight, with respect to 100 parts by weight of the thermoplastic polyester resin. The added amount of the reaction catalyst is preferably 0.01 part by weight or more, because the polymerization can be completed in a short period of time. The added amount is more preferably 0.03 parts by weight or more, and still more preferably 0.04 parts by weight or more. At the same time, the added amount of the reaction catalyst is preferably 0.2 parts by weight or less, because it allows for an improvement in the color. The added amount is more preferably 0.15 parts by weight or less, and still more preferably 0.1 part by weight or less.

In producing the thermoplastic polyester resin by solid-state polymerization, the hydroxy group concentration in the resin can be reduced by: heating the thermoplastic polyester resin in a solid-state polymerization apparatus in a nitrogen atmosphere or under vacuum reduced pressure at a temperature of 150 to 210° C., to reduce the esterification reaction or the transesterification reaction in the solid state. At this time, if the resin contains the hydroxy group blocking agent described above, hydroxy groups can be blocked more efficiently, as a result of which the hydroxy group concentration can be reduced.

The thermoplastic polyester resin composition may contain, in addition to the thermoplastic polyester resin, a thermoplastic resin (B) having a dielectric loss tangent at a frequency of 5.8 GHz, as measured by the cylindrical cavity resonator perturbation method, of 0.005 or less (sometimes referred to as "thermoplastic resin (B)"). Incorporation of the thermoplastic resin (B) allows for improvements in the low dielectric properties, moldability, dimensional accuracy, molding shrinkage and toughness. Examples of the thermoplastic resin (B) include polyolefin resins, polystyrene resins, aromatic and aliphatic polyketone resins, polyether ether ketone resins, polyimide resins, aromatic polycarbonate resins, polyarylate resins, polysulfone resins, polyethersulfone resins, polyetherimide resins and liquid crystal polymers. Two or more kinds of these resins may be contained.

The thermoplastic polyester resin composition preferably contains 10 to 150 parts by weight of the above-described thermoplastic resin (B), with respect to 100 parts by weight of the thermoplastic polyester resin. When 10 parts by weight or more of the thermoplastic resin (B) is contained, it is possible to improve the low dielectric properties and the toughness. The thermoplastic resin (B) is contained more preferably in an amount of 15 parts by weight or more, and still more preferably 20 parts by weight or more. Further, when 150 parts by weight or less of the thermoplastic resin (B) is contained, variation in the properties during molding can be reduced. The thermoplastic resin (B) is contained more preferably in an amount of 100 parts by weight or less, and still more preferably 50 parts by weight or less.

The thermoplastic polyester resin composition may contain a reactive compound (C). Incorporation of the reactive compound (C) is preferred, because it improves the hydrolysis resistance and the heat aging resistance of the thermoplastic polyester resin as well as the dispersibility of the thermoplastic resin (B), leading to excellent mechanical properties and heat resistance of the resulting thermoplastic polyester resin composition. The reactive compound (C) as used herein refers to a compound having at least one reactive functional group selected from the group consisting of an epoxy group, an acid anhydride group, an oxazoline group, an isocyanate group and a carbodiimide group. The reactive compound (C) preferably has at least one such reactive functional group from the viewpoint of improving the compatibility, and preferably has an epoxy group or an acid anhydride group from the viewpoint of controlling the reactivity.

The incorporated amount of the reactive compound (C) is preferably 1 to 50 parts by weight with respect to 100 parts by weight of the thermoplastic polyester resin. The incorporated amount of the reactive compound (C) is preferably 1 part by weight or more, because the compatibility between the component (A) and the component (B) is improved, leading to excellent mechanical properties and heat resistance of the resulting thermoplastic polyester resin composition. The incorporated amount of the reactive compound (C) is more preferably 3 parts by weight or more, and still more preferably 5 parts by weight or more. At the same time, the incorporated amount of the reactive compound (C) is preferably 50 parts by weight or less, because an increase in the dielectric properties can be reduced. The incorporated amount of the reactive compound (C) is more preferably 40 parts by weight or less, and still more preferably 30 parts by weight or less.

The functional group concentration in the reactive compound (C) is preferably 200 g/eq or more, because it allows for an improvement in the flowability. The functional group concentration is more preferably 250 g/eq or more, and still more preferably 500 g/eq or more. At the same time, the functional group concentration in the reactive compound (C) is preferably 50,000 g/eq or less, from the viewpoint of improving the mechanical properties. The functional group concentration is more preferably 20,000 g/eq or less, and particularly preferably 10,000 g/eq or less.

It is possible to define a preferred range of the melting point of the reactive compound (C) when the compound is a crystalline compound, and a preferred range of the glass transition point of the reactive compound (C) when the compound is an amorphous compound. The melting point or the glass transition point of the reactive compound (C) is preferably 50° C. or higher, because it allows for an improvement in the heat resistance. The melting point or the glass transition point is more preferably 100° C. or higher, and still more preferably 150° C. or higher. At the same time, the melting point or the glass transition point of the reactive compound (C) is preferably 300° C. or lower, because it allows for an improvement in the mechanical properties. The melting point or the glass transition point is more preferably 280° C. or lower, and still more preferably 250° C. or lower.

The reactive compound (C) preferably has a number average molecular weight of 200 or more, because it allows for an improvement in the heat resistance. The number average molecular weight of the compound (C) is more preferably 1,000 or more, and still more preferably 2,000 or more. At the same time, the number average molecular weight of the reactive compound (C) is preferably 50,000 or less, more preferably 20,000 or less, and still more preferably 10,000 or less, because it allows for an improvement in the flowability.

In using the reactive compound (C), a reaction catalyst may be used, if necessary. The use of a reaction catalyst is preferred, because it facilitates the reaction of the reactive compound (C), and improves the compatibility between the thermoplastic polyester resin and the thermoplastic resin (B). Examples of the reaction catalyst include tertiary amines, amidine compounds, organic phosphines and salts thereof, imidazole and boron compounds. Two or more kinds of these compounds may be used.

The incorporated amount of the reaction catalyst is preferably 0.1 to 5 parts by weight with respect to 100 parts by weight of the thermoplastic polyester resin. The incorporated amount of the reaction catalyst is preferably 0.1 part by weight or more, because it enables the component (B) to be finely dispersed in the resulting thermoplastic polyester resin composition, leading to excellent mechanical properties and heat resistance. The incorporated amount of the reaction catalyst is more preferably 0.2 parts by weight or more, and still more preferably 0.3 parts by weight or more. At the same time, the incorporated amount of the reaction catalyst is preferably 5 parts by weight or less, because a decrease in the molecular weight of the thermoplastic polyester resin can be reduced. The incorporated amount of the reaction catalyst is more preferably 3 parts by weight or less, and still more preferably 1 part by weight or less.

It is preferred that the thermoplastic polyester resin composition further contain an inorganic filler (D), in addition to the thermoplastic polyester resin. Incorporation of the inorganic filler (D) allows for further improving the mechanical strength and the heat resistance and, in addition, obtaining excellent low warpage properties capable of reducing the warpage of the resulting molded article.

The incorporated amount of the inorganic filler (D) is 1 to 100 parts by weight with respect to 100 parts by weight of the thermoplastic polyester resin. When the incorporated amount of the inorganic filler (D) is 1 part by weight or more, it is possible to improve the mechanical strength and the heat resistance, and reduce the amount of warpage of the resulting molded article. The incorporated amount of the inorganic filler (D) is preferably 10 parts by weight or more, more preferably 20 parts by weight or more, and still more preferably 25 parts by weight or more. Further, when the incorporated amount of the inorganic filler (D) is 100 parts by weight or less, the flowability can be maintained, and there is no risk of deteriorating the moldability. It is also possible to maintain the dielectric loss tangent at a low value. The incorporated amount of the inorganic filler (D) is preferably 90 parts by weight or less, more preferably 80 parts by weight or less, and still more preferably 70 parts by weight or less.

Specific examples of the inorganic filler (D) include fibrous, whisker-like, needle-like, granular, powder-like, and laminar inorganic fillers. More specific examples thereof include: glass fibers; PAN-based and pitch-based carbon fibers; metal fibers such as stainless-steel fibers, aluminum fibers and brass fibers; organic fibers such as aromatic polyamide fibers and liquid crystalline polyester fibers; gypsum fibers, ceramic fibers, asbestos fibers, zirconia fibers, alumina fibers, silica fibers, titanium oxide fibers, silicon carbide fibers, rock wools, potassium titanate whiskers, barium titanate whiskers, aluminum borate whiskers, silicon nitride whiskers, calcium sulfate whiskers, needle-like titanium oxide, glass beads, milled fibers, glass flakes, wollastonite, silica, kaolin, talc, calcium carbonate, zinc oxide, magnesium oxide, aluminum oxide, mixtures of magnesium oxide and aluminum oxide, silicic acid fine powder, aluminum silicate, silicon oxide, smectite clay minerals (montmorillonite and hectorite), vermiculite, mica, fluor-taeniolite, zirconium phosphate, titanium phosphate and dolomite. The above-described inorganic filler may be surface-treated with a known coupling agent (such as a silane-based coupling agent or a titanate-based coupling agent), or with another surface treatment agent. The above-described inorganic filler may be used in a combination of two or more kinds thereof.

The inorganic filler (D) is preferably glass fibers, particularly from the viewpoint of improving the mechanical strength and the heat resistance. Preferred glass fibers to be used are chopped strand glass fibers or roving glass fibers, which have been surface-treated with a silane coupling agent such as an aminosilane compound or an epoxy silane compound and/or with a sizing agent containing: urethane; a copolymer composed of acrylic acid such as an acrylic acid/styrene copolymer; a copolymer composed of maleic anhydride such as a methyl acrylate/methyl methacrylate/maleic anhydride copolymer; vinyl acetate; one or more epoxy compounds such as bisphenol A diglycidyl ether and/or a novolac-based epoxy compound; or the like.

The inorganic filler (D) is more preferably glass fibers treated with a sizing agent containing an epoxy compound(s) or the like, because such fibers have excellent reactivity with the thermoplastic polyester resin, leading to excellent mechanical properties and heat resistance of the resulting thermoplastic polyester resin composition. The silane coupling agent and/or the sizing agent may be used in a state mixed with an emulsion. Further, it is preferred that the fibrous reinforcing material usually have a fiber diameter of 1 to 30 μm. The lower limit value of the fiber diameter is preferably 5 μm, from the viewpoint of the dispersibility of the glass fibers in the thermoplastic polyester resin composition. The upper limit value of the fiber diameter is preferably 15 μm, from the viewpoint of the mechanical strength. While the fibrous reinforcing material described above usually has a fiber cross section in the form of a circle, it is also possible to use a fibrous reinforcing material having a cross section of an arbitrary shape with an arbitrary aspect ratio such as glass fibers having a cross section in the form of an ellipse, a flat shape or a cocoon shape. The use of such glass fibers provides characteristics that the flowability during injection molding can be improved, and that a molded article with a reduced warpage can be obtained. The type of the glass fibers is not particularly limited, and any of those commonly used as reinforcing materials for resins can be used. However, glass fibers made of E-glass having excellent mechanical properties and heat resistance, or those made of a low dielectric glass having excellent low dielectric properties are preferred.

The glass fibers preferably have a relative dielectric constant, as measured by the cavity resonance method at a frequency of 1 GHz, of less than 7, and more preferably less than 5. When the relative dielectric constant of the glass fibers is within the range described above, the relative dielectric constant and the dielectric loss tangent of the resulting thermoplastic polyester resin composition can be reduced to a low level.

When any of milled fibers, glass flakes, kaolin, talc and mica, for example, is/are used as the inorganic filler (D), the effect of reducing the anisotropy is provided, enabling a molded article with a reduced warpage. Further, when any of calcium carbonate, zinc oxide, magnesium oxide, aluminum oxide, a mixture of magnesium oxide and aluminum oxide, silicic acid fine powder, aluminum silicate and silicon oxide, is/are incorporated in an amount of 0.01 to 1 part by weight with respect to 100 parts by weight of the thermoplastic polyester resin, the retention stability can further be improved.

The granular, powder-like and laminar inorganic fillers preferably have an average particle size of 0.1 to 20 µm, from the viewpoint of the impact strength. The average particle size of these fillers is particularly preferably 0.2 µm or more, from the viewpoint of the dispersibility of the inorganic filler in the resin, and is preferably 10 µm or less from the viewpoint of the mechanical strength.

In the thermoplastic polyester resin composition, the dielectric loss tangent at 5.8 GHz, as measured by the cylindrical cavity resonator perturbation method at 23° C., is preferably 0.0080 or less. When the dielectric loss tangent is 0.0080 or less, it is possible to reduce the dielectric loss and to reduce the degradation of high frequency signals, thereby enabling an excellent antenna gain, radar accuracy and the like. Therefore, the resin composition can be suitably used in a high-frequency transmission part. The dielectric loss tangent is more preferably 0.0070 or less, and particularly preferably 0.0060 or less. The thermoplastic polyester resin composition having the dielectric loss tangent described above can be obtained, for example, by using the thermoplastic polyester resin in which the hydroxy group concentration is equal to or less than a specific amount, and the inorganic filler (D), in specific incorporated amounts.

Further, in the thermoplastic polyester resin composition, the relative dielectric constant at 5.8 GHz, as measured by the cylindrical cavity resonator perturbation method at 23° C., is preferably 4.0 or less, and more preferably 3.5 or less, because it is possible to reduce the transmission loss due to the reflection of high frequency waves at the surface of the resulting molded article.

The thermoplastic polyester resin composition may contain an additive(s) such as an antioxidant, an ultraviolet absorber, a light stabilizer, a plasticizer, a flame retardant, a release agent, a pigment, a dye and/or an antistatic agent, to the extent that the desired effects are not impaired.

The flame retardant may be, for example, a phosphorus-based flame retardant, a halogen-based flame retardant such as a bromine-based flame retardant, a salt of a triazine compound and cyanuric acid or isocyanuric acid, a silicone-based flame retardant or an inorganic-based flame retardant. Two or more kinds of these retardants may be incorporated.

The incorporated amount of the flame retardant is preferably 1 to 50 parts by weight with respect to 100 parts by weight of the thermoplastic polyester resin. The incorporated amount of the flame retardant is more preferably 5 parts by weight or more from the viewpoint of the heat resistance, and is more preferably 40 parts by weight or less from the viewpoint of improving the flame retardancy.

The release agent may be, for example, a wax based on an ester of a higher fatty acid such as montanic acid or stearic acid, a polyolefin wax, or an ethylene bis-stearamide wax. Incorporation of the release agent enables to improve the mold release characteristics from a mold at the time of melt-processing.

The incorporated amount of the release agent is preferably 0.01 to 1 part by weight with respect to 100 parts by weight of the thermoplastic polyester resin. The incorporated amount of the release agent is more preferably 0.03 parts by weight or more from the viewpoint of the mold release characteristics, and is more preferably 0.6 parts by weight or less from the viewpoint of the heat resistance.

It is also possible to adjust the color of the composition to any of various kinds of colors, or improve the weather resistance (light resistance) and the conductivity thereof, by incorporating one or more kinds of pigments and dyes. The pigment may be, for example, carbon black or titanium oxide.

The incorporated amount of the pigment(s) and/or dye(s) is preferably 0.01 to 3 parts by weight with respect to 100 parts by weight of the thermoplastic polyester resin. The incorporated amount of the pigment(s) and/or dye(s) is more preferably 0.03 parts by weight or more from the viewpoint of preventing unevenness in the color, and is more preferably 1 part by weight or less from the viewpoint of improving the mechanical strength.

The thermoplastic polyester resin composition can be produced, for example, by: a method in which the thermoplastic polyester resin, and any of various types of additives, if necessary, are premixed, and fed to a melt kneading machine to perform melt kneading; or a method in which predetermined amounts of respective components are fed to a melt kneading machine, using a quantitative feeder such as a weight feeder to perform melt kneading. The melt kneading machine to be used may be, for example, a single-screw extruder including a "unimelt" or "dulmadge" type screw, a twin-screw extruder, a triple-screw extruder, a conical extruder or a kneader-type mixer.

The premixing described above can be carried out, for example, by: a method of performing dry blending; or a method in which mixing is performed using a mechanical mixing apparatus such as a tumble mixer, a ribbon mixer or a Henschel mixer. Further, the inorganic filler (D) may be added through a side feeder installed in the path between the main feeder and the vent, of a multi-screw extruder such as twin-screw extruder. In incorporating a liquid additive, it is possible to use: a method in which the liquid additive is added through a liquid addition nozzle installed in the path between the main feeder and the vent, of a multi-screw extruder such as twin-screw extruder, using a plunger pump; or a method in which the liquid additive is added through the main feeder or the like, using a metering pump.

The thermoplastic polyester resin composition is preferably pelletized before being subjected to molding processing. The composition can be pelletized, for example, by a method in which the thermoplastic polyester resin composition melt-kneaded using a melt kneading machine or the like is extruded in the form of strands, and then cut with a strand cutter.

It is possible to obtain a molded article in the form of a film, a fiber and any of various other shapes, by melt molding the thermoplastic polyester resin composition. Examples of the method of melt molding include methods such as injection molding, extrusion molding and blow molding, and injection molding is particularly preferred.

As the injection molding method, gas assisted molding, two-color molding, sandwich molding, in-mold molding, insert molding, injection press molding and the like are known, in addition to common injection molding methods, and any of the molding methods can be used.

The molded article can be suitably used as a molded article selected from mechanical machine parts, electric components, electronic components and automotive parts, making use of excellent mechanical properties and heat resistance thereof.

The molded article is particularly useful as a high-frequency transmission part, because of its excellent dielectric properties in the high frequency band.

Further, the resin composition can be integrated with a metal part(s) by insert molding to form a metal composite molded article, because of its excellent low dielectric properties. Such a metal composite molded article can be suitably used as a mobile communication equipment part.

Specific examples of the mechanical machine parts, electric components, electronic components and automotive parts include breakers, electromagnetic switches, focus cases, flyback transformers, molded articles for fusers in copying machines and printers, general household electrical appliances, housings for office automation equipment, parts for variable capacitor casings, various types of terminal boards, transformers, printed wiring boards, housings, terminal blocks, coil bobbins, connectors, relays, disk drive chassis, transformers, switch parts, electric outlet parts, motor parts, sockets, plugs, capacitors, various types of casings, resistors, electric and electronic components incorporating metal terminals and conducting wires, computer-related components, audio components such as acoustic components, parts for lighting equipment, telegraphic communication equipment-related parts, telephone equipment-related parts, air conditioner parts, parts for consumer electronics such as VTRs and television sets, parts for copying machines, parts for facsimile machines, parts for optical devices, parts for automotive ignition systems, connectors for automobiles, and various types of automotive electrical components.

Specific examples of the high-frequency transmission part include antenna substrates, connectors, casings, antenna covers and sensor covers for electric and electronic components, for use in mobile communication terminals, communication base stations, millimeter wave sensors, in-vehicle communication equipment and the like.

EXAMPLES

Next, the thermoplastic polyester resin composition will be described in specific detail, with reference to Examples. The "%" and "part(s)" refer to "% by weight" and "part(s) by weight" respectively, in all instances, and the compounds expressed using "/" in the names of resins described below represent copolymers.

Methods of Measuring Respective Properties

In each of the Examples and Comparative Examples, respective properties were measured by the measurement methods described below, and evaluated.

1. Melting Point

Using DSC 7 manufactured by PerkinElmer, Inc., the thermoplastic polyester resin was analyzed by heating the resin from 25° C. to 300° C. under a nitrogen atmosphere at a temperature rise rate of 10° C./min, and the highest peak temperature of all the resulting endothermic peaks was determined.

2. Intrinsic Viscosity

Using an Ubbelohde-type viscometer and o-chlorophenol, the values of solution viscosity at concentrations of the thermoplastic polyester resin of 1.0 dl/g, 0.5 dl/g and 0.25 dl/g, at 25° C., were measured, and the resulting values of the solution viscosity were extrapolated to a concentration of 0, to determine the intrinsic viscosity (dl/g) of the resin.

3. Functional Group Concentrations (Hydroxy Groups and Aliphatic Groups)

A quantity of 2 g of the thermoplastic polyester resin was dissolved in 5 mL of hexafluoroisopropanol, and allowed to reprecipitate with 50 mL of ethanol. The resulting precipitates were collected, dried under vacuum with a vacuum dryer at 80° C., to be purified. A quantity of 30 mg of the purified product was dissolved in 0.7 mL of heavy hexafluoroisopropanol, and $^1$H-NMR measurement was carried out using JNM-ECZ500R manufactured by JEOL Ltd. The peaks in the resulting $^1$H-NMR spectrum were assigned in accordance with the method disclosed in Macromol. Chem. Phys. 2014, 215, 2138-2160. Thereafter, the integral value Sa of the peaks attributed to the residue(s) of an aromatic dicarboxylic acid(s) or an ester-forming derivative(s) thereof, and the number of hydrogen atoms Ha thereof, as well as the integral value Sb of the peaks attributed to each functional group and the number of hydrogen atoms Hb thereof, were determined, and each functional group concentration was determined from equation (1):

$$\text{Functional group concentration (mmol/g)} = \{(Sb/Sa) \times (Ha/Hb)\}/\text{unit average molecular weight} \times 1000 \quad (1).$$

The "unit average molecular weight" refers the total value obtained by multiplying the molecular weights of: the residue(s) of an aromatic dicarboxylic acid(s) or an ester-forming derivative(s) thereof; the residue(s) of a diol(s) or an ester-forming derivative(s) thereof; and the residue(s) of an aromatic hydroxycarboxylic acid or the residue(s) of an ester-forming derivative thereof; by the copolymerization ratio.

4. Carboxylic Acid Group Concentration

A quantity of 2 g of the thermoplastic polyester resin was dissolved in 50 mL of a mixed solution of o-cresol/chloroform (2/1, vol/vol), and the resulting solution was titrated with a 0.05 mol/L ethanolic potassium hydroxide, using 1% bromophenol blue as an indicator, to calculate the carboxylic acid group concentration in the resin.

5. Flowability (Melt Viscosity)

Using Capilograph 1C manufactured by Toyo Seiki Seisaku-sho, Ltd., the melt viscosity of the thermoplastic polyester resin was measured at a set temperature 20° C. higher than the melting point of the resin, under the conditions of a shear rate of 1216 (/sec) and an orifice diameter of 1 mm. The measurement was initiated 5 minutes after introducing the sample of the resin in the Capilograph. The measurement was carried out twice, and the mean value of the measured values was taken as the melt viscosity. A smaller value of the melt viscosity indicates a higher flowability. A resin with a melt viscosity of 90 Pa·s or less was evaluated as having an excellent flowability, a resin with a melt viscosity of 70 Pa·s or less was evaluated as having a more excellent flowability, and a resin with a melt viscosity of 50 Pa·s or less was evaluated as having an even more excellent flowability.

6. Mechanical Properties (Tensile Strength and Tensile Elongation)

Using an injection molding machine, NEX1000, manufactured by NISSEI PLASTIC INDUSTRIAL CO., LTD., injection molding was carried out under the temperature condition of a mold temperature of 80° C., and under the molding cycle conditions of a total of the injection time and the pressure holding time of 15 seconds, and a cooling time of 15 seconds, to obtain an ASTM No. 1 dumbbell test specimen for evaluating the tensile properties, which has a thickness of ⅛ inches (about 3.2 mm). The molding temperature was varied depending on the melting point of the thermoplastic polyester resin, and set to a temperature 20° C. higher than the melting point of the thermoplastic polyester resin. Using the resulting test specimen for evaluating the tensile properties, the strength at the maximum tension point (tensile strength) and the elongation at the maximum tension point (tensile elongation) were measured, in accordance with ASTM D638 (2005). The measurements were carried out on three test specimens, and the mean values of the respective measured values were taken as the tensile strength and the tensile elongation. A material with a high tensile strength value was evaluated as having an excellent mechanical strength, and a material with a high tensile elongation value was evaluated as having an excellent toughness. Further, in using a composition which does not contain the inorganic filler (D), a material with a tensile elongation of 5.0% or more was evaluated as having a more excellent toughness, and a material with a tensile elongation of 6.0% or more was evaluated as having an even more excellent toughness. In using a composition comprising the inorganic filler (D), a material with a tensile strength of 100 MPa or more was evaluated as having a more excellent mechanical strength, and a material with a tensile strength of 120 MPa or more was evaluated as having an even more excellent mechanical strength.

7. Heat Resistance (Heat Distortion Temperature)

Using NEX1000, manufactured by NISSEI PLASTIC INDUSTRIAL CO., LTD., injection molding was carried out under the same injection molding conditions as the test specimen for evaluating the tensile properties in the section 6 above, to obtain a test specimen for evaluating the heat distortion temperature, which has a thickness of ⅛ inches (about 3.2 mm), a length of 127 mm and a width 13 mm. Using the resulting test specimen for evaluating the heat distortion temperature, the heat distortion temperature was measured under the condition of a measurement load of 0.45 MPa, in accordance with ASTM D648 (2005). The measurements were carried out on three test specimens, and the mean value of the measured values was taken as the heat distortion temperature. A material with a heat distortion temperature of less than 80° C. was evaluated as having a poor heat resistance, and a material with a higher heat distortion temperature was evaluated as having a better heat resistance. A material with a heat distortion temperature of 120° C. or higher was evaluated as having an excellent heat resistance, and a material with a heat distortion temperature of 150° C. or higher was evaluated as having a particularly excellent heat resistance.

8. Heat Aging Resistance

Injection molding was carried out under the same injection molding conditions to obtain the test specimen for evaluating the tensile properties in the section 6 above, to obtain an ASTM No. 1 dumbbell test specimen for evaluating the tensile properties, which has a thickness of ⅛ inches (about 3.2 mm). The test specimen was placed in a hot air oven manufactured by ESPEC CORP., which had been set to a heating temperature of 175° C., allowed to stand still for 250 hours (heat aging treatment), and then taken out of the oven. After leaving the test specimen to stand for one day in the atmosphere, the strength at the maximum tension point (tensile strength) after the heat aging treatment was measured, in accordance with ASTM D638 (2005). The measurements were carried out on three test specimens, and the mean value of the measured value was taken as the strength at the maximum tension point after the heat aging treatment. Thereafter, the strength retention rate was calculated in accordance with equation (2). A material with a strength retention rate of less than 50% was evaluated as having a poor heat aging resistance, and a material with a higher strength retention rate was evaluated as having a better heat aging resistance. A material with a strength retention rate of 70% or more was evaluated as having an excellent heat aging resistance, and a material with a strength retention rate of 80% or more was evaluated as having a more excellent heat aging resistance.

$$\text{Strength retention rate (\%)} = (\text{strength at the maximum tension point after the heat aging treatment}/\text{strength at the maximum tension point before the heat aging treatment}) \times 100 \quad (2).$$

9. Evaluation of Low Warpage Properties

Using an injection molding machine, NEX1000, manufactured by NISSEI PLASTIC INDUSTRIAL CO., LTD., the thermoplastic polyester resin or the thermoplastic polyester resin composition was subjected to injection molding under the temperature condition of a mold temperature of 80° C., and under the molding cycle conditions of a total of the injection time and the pressure holding time of 15 seconds, and a cooling time of 15 seconds, to obtain a test specimen in the form of a 80 mm×80 mm square plate having a thickness of 1 mm. Any one of the corners of the resulting square plate was fixed on a surface plate, and the amount of the opposite corner risen from the surface plate, at this time, was evaluated as the amount of warpage. A material with a smaller amount of warpage was evaluated as having better low warpage properties.

10. High-frequency Dielectric Properties (Relative Dielectric Constant and Dielectric Loss Tangent)

Using an injection molding machine, TR3OEHA, manufactured by Sodick Co., Ltd., the thermoplastic polyester resin or the thermoplastic polyester resin composition was subjected to injection molding under the temperature condition of a mold temperature of 80° C., and under the molding cycle conditions of a total of the injection time and the pressure holding time of 3 seconds, and a cooling time of 15 seconds, to obtain a test specimen in the form of a 30 mm×30 mm square plate having a thickness of 0.5 mm. The resulting square plate was cut in the direction parallel to the flowing direction of the resin, in a width of 1 mm, to obtain test specimens for evaluating the dielectric properties, each having a size of 30 mm×1 mm with a thickness of 0.5 mm. Further, the thermoplastic polyester resin composition of each of the Examples and Comparative Examples was subjected to injection molding, under the same conditions to obtain the test specimen for evaluating the low warpage properties in the section 9 above, to obtain an 80 mm×80 mm square plate having a thickness of 1 mm. The resulting square plate was cut in the direction parallel to the flowing direction of the resin, in a width of 1 mm, to obtain test specimens for evaluating the dielectric properties, each having a size of 80 mm×1 mm with a thickness of 1 mm. Using the test specimens for evaluating the dielectric properties, the relative dielectric constant and the dielectric loss tangent at 23° C. and at 5.8 GHz were determined, by the cylindrical cavity resonator perturbation method using a network analyzer, E5071C, manufactured by Agilent Technologies Japan, Ltd. and a cavity resonator, CP521, manufactured by KANTO Electronic Application and Development Inc. Further, the relative dielectric constant and the dielectric loss tangent at 68 GHz were determined by the cut-off circular waveguide method using a network analyzer, N5227A, manufactured by Keysight Technologies, Inc. and a cut-off circular waveguide resonator, SUM CYLINDER ver. 2, manufactured by SUMTEC, Inc. When the values of the relative dielectric constants at 5.8 GHz and 68 GHz of the thermoplastic polyester resin are 3.1 or less, the resin was evaluated as having excellent high-frequency dielectric properties, and when the above values are 3.0 or less, the resin was evaluated as having more excellent high-frequency dielectric properties. When the value of the dielectric loss tangent at 5.8 GHz of the thermoplastic polyester resin is 0.0060 or less, the resin was evaluated as having excellent high-frequency dielectric properties, when the above value is 0.0055 or less, the resin was evaluated as having more excellent high-frequency dielectric properties, and when the above value is 0.0050 or less, the resin was evaluated as having even more excellent high-frequency dielectric properties. When the value of the dielectric loss tangent at 68 GHz of the thermoplastic polyester resin is 0.0080 or less, the resin was evaluated as having excellent high-frequency dielectric properties, when the above value is 0.0070 or less, the resin was evaluated as having more excellent high-frequency dielectric properties, and when the above value is 0.0060 or less, the resin was evaluated as having even more excellent high-frequency dielectric properties. When the value of the relative dielectric constant at 5.8 GHz of the thermoplastic polyester resin composition is 3.2 or less, the composition was evaluated as having excellent high-frequency dielectric properties, and when the above value is 3.1 or less, the composition was evaluated as having more excellent high-frequency dielectric properties. When the value of the dielectric loss tangent at 5.8 GHz of the thermoplastic polyester resin composition is 0.0080 or less, the composition was evaluated as having excellent high-frequency dielectric properties, when the above value is 0.0070 or less, the composition was evaluated as having more excellent high-frequency dielectric properties, and when the above value is 0.0060 or less, the composition was evaluated as having even more excellent high-frequency dielectric properties.

Raw materials used in the Examples and Comparative Examples are shown below. Raw Materials Terephthalic acid: one manufactured by Mitsui Chemicals, Inc.
Dimethyl terephthalate: one manufactured by SK Chemicals Co., Ltd.
Isophthalic acid: one manufactured by Tokyo Chemical Industry Co., Ltd.
Butanediol: one manufactured by Mitsubishi Chemical Corp.
Ethylene glycol: one manufactured by Mitsubishi Chemical Corp.
Cyclohexanedimethanol: one manufactured by Tokyo Chemical Industry Co., Ltd.
Benzoic acid: one manufactured by Tokyo Chemical Industry Co., Ltd.
1-Dodecanol: one manufactured by Tokyo Chemical Industry Co., Ltd.; carbon number: 12
1-Octadecanol: one manufactured by Tokyo Chemical Industry Co., Ltd.; carbon number: 18
1-Docosanol: one manufactured by Tokyo Chemical Industry Co., Ltd.; carbon number: 22
1-Butyloctanol: one manufactured by Tokyo Chemical Industry Co., Ltd.; carbon number: 12
2-Hexyl-1-dodecanol: one manufactured by Tokyo Chemical Industry Co., Ltd.; carbon number: 18
2-Octyl-1-dodecanol: one manufactured by Tokyo Chemical Industry Co., Ltd.; carbon number: 20
2-Decyl-1-tetradecanol: one manufactured by Tokyo Chemical Industry Co., Ltd.; carbon number: 24
2-Dodecyl-1-hexadecanol: ISOFOL 28 manufactured by Sasol Ltd.; carbon number: 28
2-Tetradecyl-1-octadecanol: ISOFOL32 manufactured by Sasol Ltd.; carbon number: 32
Oleyl alcohol: one manufactured by Tokyo Chemical Industry Co., Ltd.; carbon number:
1-Octadecanoic acid: one manufactured by Tokyo Chemical Industry Co., Ltd.; carbon number: 18
Butanol: one manufactured by Tokyo Chemical Industry Co., Ltd.; carbon number: 4
Octanol: one manufactured by Tokyo Chemical Industry Co., Ltd.; carbon number: 8
2-Ethyl-1-hexanol: one manufactured by Tokyo Chemical Industry Co., Ltd.; carbon number: 8
MPEG: one-end methylated polyethylene glycol having a molecular weight of 550, manufactured by Tokyo Chemical Industry Co., Ltd.
Tetrabutyl titanate: one manufactured by Tokyo Chemical Industry Co., Ltd.
Magnesium acetate tetrahydrate: one manufactured by Tokyo Chemical Industry Co., Ltd.
Antimony trioxide: one manufactured by NIHON SEIKO CO., LTD.
Trimethyl phosphate: one manufactured by Tokyo Chemical Industry Co., Ltd. Thermoplastic Resin (B)
(B-1) Linear low-density polyethylene resin: "ULTZEX" (registered trademark) 4570 (having a dielectric loss tangent at 5.8 GHz of 0.0009), manufactured by Prime Polymer Co., Ltd. was used.
(B-2) Polystyrene resin: GPPS HF77 (having a dielectric loss tangent at 5.8 GHz of 0.0013) manufactured by PS Japan Corporation was used.
(B-3) Polycarbonate resin: "TARFLON" (registered trademark) A2200 (having a dielectric loss tangent at 5.8 GHz of 0.0049) manufactured by Idemitsu Kosan Co., Ltd. was used. Reactive Compound (C)
(C-1) Ethylene-glycidyl methacrylate copolymer: "BONDFAST" (registered trademark) BF-2C (functional group concentration: 600 g/eq) having a content ratio of glycidyl methacrylate of 6%, manufactured by Sumitomo Chemical Company, Limited was used.
(C-2) Epoxidized product of styrene-butadiene block copolymer: "EPOFRIEND" (registered trademark) AT501 (having a functional group concentration of 1,000 g/eq), manufactured by Daicel Corp. was used.
(C-3) Maleic anhydride-denatured polypropylene: "FUSABOND" (registered trademark) P613 (having a functional group concentration of 4,500 g/eq) manufactured by Dow Inc. was used. Inorganic Filler (D)
(D-1) Glass fiber: glass fiber ECSO3T-187 manufactured by Nippon Electric Glass Co., Ltd., having a cross-sectional diameter of 13 μm, a fiber length of 3 mm and a dielectric constant (1 GHz) of about 6.6, and treated with an epoxy-based sizing agent, was used.
(D-2) Glass fiber: glass fiber ECS303N-3KNHL manufactured by Chongqing Polycomp International Corp., having a cross-sectional diameter of 13 μm, a fiber length of 3 mm and a dielectric constant (1 GHz) of about 4.5, and treated with an epoxy-based sizing agent, was used. Other Additive (E)
(E-3) Organic phosphonium salt: tetraphenyl phosphonium bromide; tetraphenyl phosphonium bromide (reagent) manufactured by Tokyo Chemical Industry Co., Ltd. was used.

Example 1

With the molar ratio ((a)/(b)) of the diol component (a) to the dicarboxylic acid component (b) in the esterification reaction set to 1.7, 2,000 g of terephthalic acid as the dicarboxylic acid component (b), 1,840 g of butanediol (BDO) as the diol component (a), 58 g of benzoic acid (4% by mole with respect to 100% by mole of terephthalic acid), and TBT (tetrabutyl titanate) as an esterification reaction catalyst in an amount of $7.5 \times 10^{-5}$ moles with respect to 100 g of the thermoplastic resin to be produced (0.025 parts by weight with respect to 100 parts by weight of the thermoplastic resin), were charged into a reactor equipped with a rectifying column. Then, the esterification reaction was initiated at a temperature of 160° C. and under reduced pressure of 90 kPa. Thereafter, the temperature was gradually increased, and the esterification reaction carried out finally at a temperature of 225° C. Completion of the esterification reaction was confirmed by the state of the distillate and the like, and the esterification reaction was carried out for a reaction time of 180 minutes. To the resulting reaction product, TBT as a polycondensation reaction catalyst was added in an amount of $7.5 \times 10^{-5}$ moles with respect to 100 g of the polyester resin to be produced (0.025 parts by weight with respect to 100 parts by weight of the thermoplastic polyester resin), and the polycondensation reaction was carried out under the conditions of a temperature of 245° C. and a pressure of 100 Pa. Completion of the polycondensation reaction was confirmed by the viscosity of the reaction product and the like, and the polycondensation reaction to obtain the thermoplastic resin was carried out for a reaction time of 170 minutes. A total of 350 minutes of reaction was carried out to obtain the thermoplastic polyester resin.

Example 2

With the molar ratio ((a)/(b)) of the diol component (a) to the dicarboxylic acid component (b) in the esterification reaction set to 1.7, 2,000 g of terephthalic acid as the dicarboxylic acid component (b), 1,840 g of butanediol (BDO) as the diol component (a), 116 g of benzoic acid (8% by mole with respect to 100% by mole of terephthalic acid), and TBT as an esterification reaction catalyst in an amount of $7.5 \times 10^{-5}$ moles with respect to 100 g of the thermoplastic resin to be produced (0.025 parts by weight with respect to 100 parts by weight of the thermoplastic resin), were charged into a reactor equipped with a rectifying column. Then, the esterification reaction was initiated at a temperature of 160° C. and under reduced pressure of 90 kPa. Thereafter, the temperature was gradually increased, and the esterification reaction carried out finally at a temperature of 225° C. Completion of the esterification reaction was confirmed by the state of the distillate and the like, and the esterification reaction was carried out for a reaction time of 180 minutes. To the resulting reaction product, TBT as a polycondensation reaction catalyst was added in an amount of $7.5 \times 10^{-5}$ moles with respect to 100 g of the polyester resin to be produced (0.025 parts by weight with respect to 100 parts by weight of the thermoplastic resin), and the polycondensation reaction was carried out under the conditions of a temperature of 245° C. and a pressure of 100 Pa. Completion of the polycondensation reaction was confirmed by the viscosity of the reaction product and the like, and the polycondensation reaction to obtain the thermoplastic resin was carried out for a reaction time of 200 minutes. A total of 380 minutes of reaction was carried out to obtain the thermoplastic polyester resin.

Example 3

A quantity of 1,000 g of the thermoplastic polyester resin obtained in Example 1 was heated under a nitrogen gas stream at 190° C. for 24 hours, in a vacuum dryer, LCV-233, manufactured by ESPEC CORP., to carry out a solid-state polymerization reaction.

Example 4

A co-rotating twin-screw extruder with a vent (TEX-30a, manufactured by Japan Steel Works, Ltd.) having a screw diameter of 30 mm and an L/D ratio of 35 was used. A quantity of 3,000 g of a polybutylene terephthalate resin "TORAYCON" (registered trademark) 1100M (melting point: 225° C.) manufactured by Toray Industries, Inc., and 150 g of benzoic anhydride were dry blended, and then introduced into the twin-screw extruder from the main feeder thereof. The mixture was melt-blended under the extrusion conditions of a kneading temperature of 260° C. and a screw rotation speed of 150 rpm. The resulting resin composition was extruded in the form of strands, allowed to solidify by being passed through a cooling bath, and then cut with a strand cutter, to obtain pellets.

Example 5

The same procedure as in Example 4 was carried out except that a polyethylene terephthalate resin (melting point: 250° C., IV=1.2) manufactured by Toray Industries, Inc. was used, instead of the polybutylene terephthalate resin used in Example 4.

Comparative Example 1

With the molar ratio ((a)/(b)) of the diol component (a) to the dicarboxylic acid component (b) in the esterification reaction set to 1.7, 2,000 g of terephthalic acid as the dicarboxylic acid component (b), 1,840 g of butanediol (BDO) as the diol component (a), and TBT as an esterification reaction catalyst in an amount of $7.5 \times 10^{-5}$ moles with respect to 100 g of the thermoplastic resin to be produced (0.025 parts by weight with respect to 100 parts by weight of the thermoplastic resin), were charged into a reactor equipped with a rectifying column. Then, the esterification reaction was initiated at a temperature of 160° C. and under reduced pressure of 90 kPa. Thereafter, the temperature was gradually increased, and the esterification reaction carried out finally at a temperature of 225° C. Completion of the esterification reaction was confirmed by the state of the distillate and the like, and the esterification reaction was carried out for a reaction time of 180 minutes. To the resulting reaction product, TBT as a polycondensation reaction catalyst was added in an amount of $7.5 \times 10^{-5}$ moles with respect to 100 g of the polyester resin to be produced (0.025 parts by weight with respect to 100 parts by weight of the thermoplastic resin), and the polycondensation reaction was carried out under the conditions of a temperature of 245° C. and a pressure of 100 Pa. Completion of the polycondensation reaction was confirmed by the viscosity of the reaction product and the like, and the polycondensation reaction to obtain the thermoplastic resin was carried out for a reaction time of 150 minutes. A total of 330 minutes of reaction was carried out to obtain the thermoplastic polyester resin.

Comparative Example 2

With the molar ratio ((a)/(b)) of the diol component (a) to the dicarboxylic acid component (b) in the esterification reaction set to 1.2, 2,000 g of terephthalic acid as the dicarboxylic acid component (b), 1,300 g of butanediol (BDO) as the diol component (a), and TBT as an esterification reaction catalyst in an amount of $7.5 \times 10^{-5}$ moles with respect to 100 g of the thermoplastic resin to be produced (0.025 parts by weight with respect to 100 parts by weight of the thermoplastic resin), were charged into a reactor equipped with a rectifying column. Then, the esterification reaction was initiated at a temperature of 160° C. and under reduced pressure of 90 kPa. Thereafter, the temperature was gradually increased, and the esterification reaction carried out finally at a temperature of 225° C. Completion of the esterification reaction was confirmed by the state of the distillate and the like, and the esterification reaction was carried out for a reaction time of 180 minutes. To the resulting reaction product, TBT as a polycondensation reaction catalyst was added in an amount of $7.5 \times 10^{-5}$ moles with respect to 100 g of the polyester resin to be produced (0.025 parts by weight with respect to 100 parts by weight of the thermoplastic resin), and the polycondensation reaction was carried out under the conditions of a temperature of 245° C. and a pressure of 100 Pa. Completion of the polycondensation reaction was confirmed by the viscosity of the reaction product and the like, and the polycondensation reaction to obtain the thermoplastic resin was carried out for a reaction time of 260 minutes. A total of 440 minutes of reaction was carried out to obtain the thermoplastic polyester resin.

Comparative Example 3

A quantity of 1,000 g of the thermoplastic polyester resin obtained in Comparative Example 1 was heated under a nitrogen gas stream at 190° C. for 24 hours, in a vacuum dryer, LCV-233, manufactured by ESPEC CORP., to carry out a solid-state polymerization reaction.

Comparative Example 4

A polyethylene terephthalate resin (melting point: 250° C., IV=1.2) manufactured by Toray Industries, Inc. was used as it is.

Example 6

With the molar ratio ((a)/(b)) of the diol component (a) to the dicarboxylic acid component (b) in the esterification reaction set to 1.5, 2,000 g of terephthalic acid as the dicarboxylic acid component, 1,627 g of butanediol (BDO) as the diol component, 49 g (1.5% by mole with respect to 100% by mole of terephthalic acid) of 1-octadecanol as a linear aliphatic alcohol, and TBT (tetrabutyl titanate) as an esterification reaction catalyst in an amount of $7.5 \times 10^{-5}$ moles with respect to 100 g of the thermoplastic resin to be produced (0.025 parts by weight with respect to 100 parts by weight of the thermoplastic resin), were charged into a reactor equipped with a rectifying column. Then, the esterification reaction was initiated at a temperature of 160° C. and under a nitrogen gas stream. Thereafter, the temperature was gradually increased, and the esterification reaction carried out finally at a temperature of 225° C. Completion of the esterification reaction was confirmed by the state of the distillate and the like, and the esterification reaction was carried out for a reaction time of 220 minutes. To the resulting reaction product, TBT as a polycondensation reaction catalyst was added in an amount of $7.5 \times 10^{-5}$ moles with respect to 100 g of the polyester resin to be produced (0.025 parts by weight with respect to 100 parts by weight of the thermoplastic resin), and the polycondensation reaction was carried out under the conditions of a temperature of 260° C. and a pressure of 100 Pa. Completion of the polycondensation reaction was confirmed by the viscosity of the reaction product and the like, and the polycondensation reaction to obtain the thermoplastic resin was carried out for a reaction time of 140 minutes. A total of 360 minutes of reaction was carried out to obtain the thermoplastic polyester resin.

Examples 7 to 39

Polymerization reactions were carried out under the same conditions as in Example 6, except that, in each Example, the raw materials, the esterification reaction time and the polycondensation time were changed, in accordance with the composition and the reaction times shown in Tables 2 to 5, to obtain the thermoplastic polyester resins.

Example 40

With the molar ratio ((a)/(b)) of the diol component (a) to the dicarboxylic acid component (b) in the transesterification reaction set to 1.2, 2,000 g of dimethyl terephthalate as the dicarboxylic acid component, 770 g of ethylene glycol (EG) as the diol component, 74 g (1.5% by mole with respect to 100% by mole of terephthalic acid) of dodecylhexadecanol as a linear aliphatic alcohol, and magnesium acetate tetrahydrate as a transesterification reaction catalyst in an amount of $2.8 \times 10^{-4}$ moles with respect to 100 g of the thermoplastic resin to be produced (0.06 parts by weight with respect to 100 parts by weight of the thermoplastic resin), were charged into a reactor equipped with a rectifying column. Then, the transesterification reaction was initiated at a temperature of 160° C. and under a nitrogen gas stream. Thereafter, the temperature was gradually increased, and the transesterification reaction was carried out finally at a temperature of 240° C. Completion of the transesterification reaction was confirmed by the state of the distillate and the like, and the transesterification reaction was carried out for a reaction time of 220 minutes. To the resulting reaction product, antimony trioxide in an amount of $1.0 \times 10^{-4}$ moles with respect to 100 g of the polyester resin to be produced (0.029 parts by weight with respect to 100 parts by weight of the thermoplastic resin), and trimethyl phosphate in an amount of $1.0 \times 10^{-4}$ moles with respect to 100 g of the polyester resin to be produced (0.014 parts by weight with respect to 100 parts by weight of the thermoplastic resin), as polycondensation reaction catalysts, were added, and the polycondensation reaction was carried out under the conditions of a temperature of 290° C. and a pressure of 100 Pa. Completion of the polycondensation reaction was confirmed by the viscosity of the reaction product and the like, and the polycondensation reaction to obtain the thermoplastic resin was carried out for a reaction time of 140 minutes. A total of 360 minutes of reaction was carried out to obtain the thermoplastic polyester resin.

Example 41

A polymerization reaction was carried out under the same conditions as in Example 40, except that 193 g of ethylene glycol and 1,313 g of cyclohexane dimethanol (CHDM) were used instead of the diol component used in Example 40.

Example 42

A polymerization reaction was carried out under the same conditions as in Example 12, except that dodecylhexadecanol as a linear aliphatic alcohol was added at the start of the reaction in the polycondensation reaction step, not in the esterification reaction step.

Comparative Examples 5 to 11

Polymerization reactions were carried out under the same conditions as in Example 6, except that, in each Example, the raw materials, the esterification reaction time and the polycondensation time were changed, in accordance with the composition and the reaction times shown in Table 6, to obtain the thermoplastic polyester resins.

Comparative Example 12

A polymerization reaction was carried out under the same conditions as in Example 40, except that the raw materials, the transesterification reaction time and the polycondensation time were changed, in accordance with the composition and the reaction times shown in Table 6, to obtain the thermoplastic polyester resin.

Examples 43 to 57 and Comparative Example 13

A co-rotating twin-screw extruder with a vent (TEX-30α, manufactured by Japan Steel Works, Ltd.) having a screw diameter of 30 mm and an L/D ratio of 35 was used. In each example, the thermoplastic polyester resin, the thermoplastic resin (B), the compound having a reactive functional group(s) (C), and the other additive (E) were mixed in the composition shown in Tables 7 or 8, and then introduced into the twin-screw extruder from the main feeder thereof. The inorganic filler (D) was added through a side feeder installed in the path between the main feeder and the vent. The mixture was melt-blended under the extrusion conditions of a kneading temperature of 260° C. and a screw rotation speed of 150 rpm. The resulting resin composition was extruded in the form of strands, allowed to solidify by being passed through a cooling bath, and then cut with a strand cutter, to obtain pellets.

The resulting pellets were dried in a hot air dryer set to a temperature of 110° C. for 6 hours, and then evaluated by the methods described above. The results are shown in Tables 7 and 8.

TABLE 1

| | | Unit | Examples | | | | |
|---|---|---|---|---|---|---|---|
| | | | 1 | 2 | 3 | 4 | 5 |
| Production Method | | — | Polycondensation Reaction | Polycondensation Reaction | Solid-state Polymerization | Melt Kneading | Melt Kneading |
| Melting point | | ° C. | 225 | 225 | 225 | 225 | 250 |
| Intrinsic Viscosity | | dl/g | 0.98 | 0.97 | 1.3 | 0.93 | 1.22 |
| Functional Group Concentration (Hydroxy Groups) | | mmol/g | 0.045 | 0.025 | 0.020 | 0.031 | 0.034 |
| Carboxylic Acid Group Concentration | | mmol/g | 0.030 | 0.031 | 0.019 | 0.019 | 0.035 |
| Flowability (Melt Viscosity) | | Pa · s | 121 | 123 | 205 | 111 | 185 |
| Mechanical Properties | Tensile Strength | MPa | 60 | 60 | 55 | 60 | 60 |
| | Tensile Elongation | % | 5.3 | 5.5 | 8.5 | 5.6 | 5.6 |
| Heat Resistance (Heat Distortion Temperature) | | ° C. | 61 | 61 | 60 | 61 | 78 |
| Hydrolysis Resistance (Tensile Strength Retention Rate) | | % | 64 | 65 | 85 | 83 | 58 |
| Heat Aging Resistance (Strength Retention Rate after 175° C. × 250 hours) | | % | 68 | 66 | 69 | 70 | 70 |
| High-frequency Dielectric Properties (5.8 GHz) | Relative Dielectric Constant | — | 2.78 | 2.78 | 2.78 | 2.77 | 2.83 |
| | Dielectric Loss Tangent | | 0.0057 | 0.0050 | 0.0048 | 0.0051 | 0.0054 |
| High-frequency Dielectric Properties (68 GHz) | Relative Dielectric Constant | — | 2.81 | 2.78 | 2.79 | 2.78 | 2.84 |
| | Dielectric Loss Tangent | | 0.0058 | 0.0050 | 0.0049 | 0.0051 | 0.0055 |

| | | Unit | Comparative Examples | | | |
|---|---|---|---|---|---|---|
| | | | 1 | 2 | 3 | 4 |
| Production Method | | — | Polycondensation Reaction | Polycondensation Reaction | Solid-state Polymerization | — |
| Melting point | | ° C. | 225 | 225 | 250 | 250 |
| Intrinsic Viscosity | | dl/g | 0.95 | 1.01 | 1.41 | 1.03 |
| Functional Group Concentration (Hydroxy Groups) | | mmol/g | 0.095 | 0.055 | 0.052 | 0.101 |
| Carboxylic Acid Group Concentration | | mmol/g | 0.032 | 0.060 | 0.021 | 0.042 |
| Flowability (Melt Viscosity) | | Pa · s | 122 | 135 | 279 | 134 |
| Mechanical Properties | Tensile Strength | MPa | 60 | 59 | 62 | 65 |

TABLE 1-continued

|  |  |  |  |  |  |  |
|---|---|---|---|---|---|---|
|  | Tensile Elongation | % | 5.6 | 4.6 | 7.1 | 4.5 |
| Heat Resistance (Heat Distortion Temperature) |  | ° C. | 61 | 60 | 61 | 78 |
| Hydrolysis Resistance (Tensile Strength Retention Rate) |  | % | 63 | 24 | 75 | 26 |
| Heat Aging Resistance (Strength Retention Rate after 175° C. × 250 hours) |  | % | 68 | 68 | 69 | 67 |
| High-frequency Dielectric Properties (5.8 GHz) | Relative Dielectric Constant | — | 2.77 | 2.83 | 2.79 | 2.84 |
|  | Dielectric Loss Tangent | — | 0.0073 | 0.0064 | 0.0063 | 0.0081 |
| High-frequency Dielectric Properties (68 GHz) | Relative Dielectric Constant | — | 2.80 | 2.85 | 2.87 | 2.85 |
|  | Dielectric Loss Tangent | — | 0.0102 | 0.0088 | 0.0082 | 0.0121 |

TABLE 2

|  |  |  |  | Examples |  |  |  |  |
|---|---|---|---|---|---|---|---|---|
|  |  |  | Unit | 6 | 7 | 8 | 9 | 10 |
| Dicarboxylic Acid Component | Terephthalic acid |  | mol/% | 100 | 100 | 100 | 100 | 100 |
| Diol Component | Butanediol |  | mol/% | 150 | 150 | 150 | 150 | 150 |
| Linear Aliphatic Alcohol | 1-Octadecanol | C18 | mol/% | 1.5 |  |  |  |  |
|  | 1-Docosanol | C22 | mol/% |  | 1.5 |  |  |  |
| Branched Aliphatic Alcohol | 1-Butyloctanol | C12 | mol/% |  |  | 1.5 |  |  |
|  | 1-Hexyldodecanol | C18 | mol/% |  |  |  | 1.5 |  |
|  | 1-Octyldodecanol | C20 | mol/% |  |  |  |  | 1.5 |
|  | 2-Decyl-1-tetradecanol | C24 | mol/% |  |  |  |  |  |
|  | 2-Dodecyl-1-hexadecanol | C28 | mol/% |  |  |  |  |  |
|  | 2-Tetradecyl-1-octadecanol | C32 | mol/% |  |  |  |  |  |
| Unsaturated Aliphatic Alcohol | Oleyl alcohol | C18 | mol/% |  |  |  |  |  |
| Type of Aliphatic Group Introduced |  |  | — | Linear | Linear | Branched | Branched | Branched |
| Carbon Number of Aliphatic Group Introduced |  |  | — | 18 | 22 | 12 | 18 | 20 |
| Esterification Reaction Time |  |  | min | 220 | 220 | 220 | 220 | 220 |
| Polycondensation Reaction Time |  |  | min | 140 | 140 | 140 | 140 | 140 |
| Melting point |  |  | ° C. | 222 | 220 | 228 | 228 | 229 |
| Functional Group Concentration (Aliphatic Groups) |  |  | mmol/g | 0.063 | 0.068 | 0.064 | 0.064 | 0.066 |
| Functional Group Concentration (Hydroxy Groups) |  |  | mmol/g | 0.032 | 0.020 | 0.045 | 0.025 | 0.017 |
| Carboxylic Acid Group Concentration |  |  | mmol/g | 0.032 | 0.032 | 0.036 | 0.029 | 0.03 |
| Molecular Weight of Aliphatic Group/Number Average Molecular Weight of Thermoplastic Polyester Resin |  |  | — | 0.016 | 0.019 | 0.012 | 0.015 | 0.016 |
| Flowability (Melt Viscosity) |  |  | Pa · s | 74 | 72 | 75 | 65 | 58 |
| Mechanical Properties | Tensile Strength |  | MPa | 60 | 60 | 59 | 59 | 60 |
|  | Tensile Elongation |  | % | 5.6 | 5.7 | 5.7 | 5.7 | 5.9 |
| Heat Resistance (Heat Distortion Temperature) |  |  | ° C. | 160 | 158 | 170 | 176 | 178 |
| Heat Aging Resistance (Strength Retention Rate after 175° C. × 250 hours) |  |  | % | 74 | 76 | 71 | 80 | 81 |
| High-frequency Dielectric Properties (5.8 GHz) | Relative Dielectric Constant |  | — | 2.77 | 2.75 | 2.75 | 2.75 | 2.74 |
|  | Dielectric Loss Tangent |  | — | 0.0058 | 0.0058 | 0.0060 | 0.0054 | 0.050 |
| High-frequency Dielectric Properties (68 GHz) | Relative Dielectric Constant |  | — | 2.78 | 2.76 | 2.76 | 2.76 | 2.75 |
|  | Dielectric Loss Tangent |  | — | 0.0059 | 0.0059 | 0.0060 | 0.0055 | 0.050 |

TABLE 2-continued

|  |  | Unit | Examples | | | |
|---|---|---|---|---|---|---|
|  |  |  | 11 | 12 | 13 | 14 |
| Dicarboxylic Acid Component | Terephthalic acid | mol/% | 100 | 100 | 100 | 100 |
| Diol Component | Butanediol | mol/% | 150 | 150 | 150 | 150 |
| Linear Aliphatic Alcohol | 1-Octadecanol C18 | mol/% |  |  |  |  |
|  | 1-Docosanol C22 | mol/% |  |  |  |  |
| Branched Aliphatic Alcohol | 1-Butyloctanol C12 | mol/% |  |  |  |  |
|  | 1-Hexyldodecanol C18 | mol/% |  |  |  |  |
|  | 1-Octyldodecanol C20 | mol/% |  |  |  |  |
|  | 2-Decyl-1-tetradecanol C24 | mol/% | 1.5 |  |  |  |
|  | 2-Dodecyl-1-hexadecanol C28 | mol/% |  | 1.5 |  |  |
|  | 2-Tetradecyl-1-octadecanol C32 | mol/% |  |  | 1.5 |  |
| Unsaturated Aliphatic Alcohol | Oleyl alcohol C18 | mol/% |  |  |  | 1.5 |
| Type of Aliphatic Group Introduced |  | — | Branched | Branched | Branched | Unsaturated Linear |
| Carbon Number of Aliphatic Group Introduced |  | — | 24 | 28 | 32 | 18 |
| Esterification Reaction Time |  | min | 220 | 220 | 220 | 220 |
| Polycondensation Reaction Time |  | min | 140 | 140 | 140 | 140 |
| Melting point |  | °C. | 229 | 230 | 228 | 223 |
| Functional Group Concentration (Aliphatic Groups) |  | mmol/g | 0.068 | 0.069 | 0.070 | 0.057 |
| Functional Group Concentration (Hydroxy Groups) |  | mmol/g | 0.017 | 0.015 | 0.014 | 0.022 |
| Carboxylic Acid Group Concentration |  | mmol/g | 0.031 | 0.032 | 0.034 | 0.037 |
| Molecular Weight of Aliphatic Group/Number Average Molecular Weight of Thermoplastic Polyester Resin |  | — | 0.020 | 0.023 | 0.026 | 0.015 |
| Flowability (Melt Viscosity) |  | Pa · s | 42 | 42 | 43 | 79 |
| Mechanical Properties | Tensile Strength | MPa | 60 | 61 | 60 | 60 |
|  | Tensile Elongation | % | 6.1 | 6.2 | 5.8 | 5.6 |
| Heat Resistance (Heat Distortion Temperature) |  | °C. | 178 | 179 | 175 | 155 |
| Heat Aging Resistance (Strength Retention Rate after 175° C. × 250 hours) |  | % | 82 | 83 | 82 | 65 |
| High-frequency Dielectric Properties (5.8 GHz) | Relative Dielectric Constant | — | 2.72 | 2.71 | 2.72 | 2.75 |
|  | Dielectric Loss Tangent | — | 0.0048 | 0.0047 | 0.0049 | 0.0060 |
| High-frequency Dielectric Properties (68 GHz) | Relative Dielectric Constant | — | 2.73 | 2.72 | 2.73 | 2.76 |
|  | Dielectric Loss Tangent | — | 0.0049 | 0.0048 | 0.0050 | 0.0061 |

TABLE 3

|  |  |  | Unit | Examples | | | | | |
|---|---|---|---|---|---|---|---|---|---|
|  |  |  |  | 15 | 16 | 17 | 18 | 19 | 20 |
| Dicarboxylic Acid | Terephthalic acid |  | mol/% | 100 | 100 | 100 | 100 | 100 | 100 |
| Diol | Butanediol |  | mol/% | 150 | 150 | 150 | 150 | 150 | 150 |
| Linear Aliphatic Alcohol | 1-Octadecanol | C18 | mol/% | 0.3 | 0.5 | 0.8 | 2.0 | 2.5 | 3.0 |
| Branched Aliphatic Alcohol | 2-Hexyl-1-dodecanol | C18 | mol/% |  |  |  |  |  |  |
|  | 2-Decyl-1-tetradecanol | C24 | mol/% |  |  |  |  |  |  |
|  | 2-Dodecyl-1-hexadecanol | C28 | mol/% |  |  |  |  |  |  |
| Type of Aliphatic Group Introduced |  |  | — | Linear | Linear | Linear | Linear | Linear | Linear |
| Carbon Number of Aliphatic Group Introduced |  |  | — | 18 | 18 | 18 | 18 | 18 | 18 |
| Esterification Reaction Time |  |  | min | 220 | 220 | 220 | 220 | 220 | 220 |
| Polycondensation Reaction Time |  |  | min | 140 | 140 | 140 | 140 | 150 | 160 |
| Melting point |  |  | °C. | 225 | 224 | 224 | 220 | 221 | 220 |
| Functional Group Concentration (Aliphatic Groups) |  |  | mmol/g | 0.011 | 0.019 | 0.030 | 0.072 | 0.093 | 0.111 |
| Functional Group Concentration (Hydroxy Groups) |  |  | mmol/g | 0.040 | 0.039 | 0.038 | 0.033 | 0.012 | 0.005 |
| Carboxylic Acid Group Concentration |  |  | mmol/g | 0.035 | 0.028 | 0.028 | 0.035 | 0.030 | 0.015 |
| Molecular Weight of Aliphatic Group/Number Average Molecular Weight of Thermoplastic Polyester Resin |  |  | — | 0.011 | 0.011 | 0.012 | 0.018 | 0.017 | 0.017 |
| Flowability (Melt Viscosity) |  |  | Pa · s | 89 | 85 | 85 | 75 | 72 | 71 |
| Mechanical Properties | Tensile Strength |  | MPa | 55 | 56 | 56 | 52 | 51 | 50 |
|  | Tensile Elongation |  | % | 5.3 | 5.2 | 5.2 | 5.2 | 4.8 | 4.5 |
| Heat Resistance (Heat Distortion Temperature) |  |  | °C. | 160 | 160 | 160 | 160 | 158 | 157 |

TABLE 3-continued

|  |  |  | 16 | 17 | 18 | 19 | 20 | (cont) |
|---|---|---|---|---|---|---|---|---|
| Heat Aging Resistance (Strength Retention Rate after 175° C. × 250 hours) | | % | 73 | 75 | 75 | 78 | 71 | 69 |
| High-frequency Dielectric Properties (5.8 GHz) | Relative Dielectric Constant | — | 2.79 | 2.77 | 2.77 | 2.77 | 2.76 | 2.75 |
| | Dielectric Loss Tangent | — | 0.0059 | 0.0059 | 0.0058 | 0.0057 | 0.0056 | 0.0056 |
| High-frequency Dielectric Properties (68 GHz) | Relative Dielectric Constant | — | 2.80 | 2.78 | 2.78 | 2.78 | 2.77 | 2.76 |
| | Dielectric Loss Tangent | — | 0.0060 | 0.0060 | 0.0059 | 0.0058 | 0.0057 | 0.0057 |

|  |  |  |  | Unit | Examples 21 | 22 | 23 | 24 | 25 |
|---|---|---|---|---|---|---|---|---|---|
| Dicarboxylic Acid | Terephthalic acid | | | mol/% | 100 | 100 | 100 | 100 | 100 |
| Diol | Butanediol | | | mol/% | 150 | 150 | 150 | 150 | 150 |
| Linear Aliphatic Alcohol | 1-Octadecanol | C18 | | mol/% | | | | | |
| Branched Aliphatic Alcohol | 2-Hexyl-1-dodecanol | C18 | | mol/% | 0.3 | 0.8 | 2.0 | 2.5 | 3.0 |
| | 2-Decyl-1-tetradecanol | C24 | | mol/% | | | | | |
| | 2-Dodecyl-1-hexadecanol | C28 | | mol/% | | | | | |
| Type of Aliphatic Group Introduced | | | | — | Branched | Branched | Branched | Branched | Branched |
| Carbon Number of Aliphatic Group Introduced | | | | — | 18 | 18 | 18 | 18 | 18 |
| Esterification Reaction Time | | | | min | 220 | 220 | 220 | 220 | 220 |
| Polycondensation Reaction Time | | | | min | 150 | 140 | 140 | 150 | 160 |
| Melting point | | | | ° C. | 225 | 227 | 228 | 228 | 226 |
| Functional Group Concentration (Aliphatic Groups) | | | | mmol/g | 0.011 | 0.030 | 0.073 | 0.092 | 0.108 |
| Functional Group Concentration (Hydroxy Groups) | | | | mmol/g | 0.050 | 0.048 | 0.026 | 0.013 | 0.005 |
| Carboxylic Acid Group Concentration | | | | mmol/g | 0.032 | 0.030 | 0.027 | 0.027 | 0.020 |
| Molecular Weight of Aliphatic Group/Number Average Molecular Weight of Thermoplastic Polyester Resin | | | | — | 0.012 | 0.014 | 0.016 | 0.017 | 0.017 |
| Flowability (Melt Viscosity) | | | | Pa·s | 95 | 68 | 58 | 53 | 51 |
| Mechanical Properties | Tensile Strength | | | MPa | 58 | 59 | 59 | 58.0 | 49.0 |
| | Tensile Elongation | | | % | 5.5 | 5.7 | 5.7 | 5.1 | 4.1 |
| Heat Resistance (Heat Distortion Temperature) | | | | ° C. | 171 | 173 | 176 | 170 | 155 |
| Heat Aging Resistance (Strength Retention Rate after 175° C. × 250 hours) | | | | % | 72 | 78 | 80 | 75 | 65 |
| High-frequency Dielectric Properties (5.8 GHz) | Relative Dielectric Constant | | | — | 2.77 | 2.76 | 2.74 | 2.73 | 2.72 |
| | Dielectric Loss Tangent | | | — | 0.0053 | 0.0049 | 0.0049 | 0.0051 | 0.0049 |
| High-frequency Dielectric Properties (68 GHz) | Relative Dielectric Constant | | | — | 2.78 | 2.77 | 2.75 | 2.74 | 2.73 |
| | Dielectric Loss Tangent | | | — | 0.0054 | 0.0050 | 0.0050 | 0.0052 | 0.0050 |

TABLE 4

|  |  |  |  | Unit | Examples 26 | 27 | 28 | 29 | 30 | 31 |
|---|---|---|---|---|---|---|---|---|---|---|
| Dicarboxylic Acid | Terephthalic acid | | | mol/% | 100 | 100 | 100 | 100 | 100 | 100 |
| Diol | Butanediol | | | mol/% | 150 | 150 | 150 | 150 | 150 | 150 |
| Linear Aliphatic Alcohol | 1-Octadecanol | C18 | | mol/% | | | | | | |
| Branched Aliphatic Alcohol | 2-Hexyl-1-dodecanol | C18 | | mol/% | | | | | | |
| | 2-Decyl-1-tetradecanol | C24 | | mol/% | 0.3 | 0.5 | 0.8 | 2.0 | 2.5 | 3.0 |
| | 2-Dodecyl-1-hexadecanol | C28 | | mol/% | | | | | | |
| Type of Aliphatic Group Introduced | | | | — | Branched | Branched | Branched | Branched | Branched | Branched |
| Carbon Number of Aliphatic Group Introduced | | | | — | 24 | 24 | 24 | 24 | 24 | 24 |
| Esterification Reaction Time | | | | min | 220 | 220 | 220 | 220 | 220 | 220 |
| Polycondensation Reaction Time | | | | min | 140 | 140 | 140 | 140 | 150 | 160 |
| Melting point | | | | ° C. | 226 | 227 | 227 | 229 | 227 | 225 |
| Functional Group Concentration (Aliphatic Groups) | | | | mmol/g | 0.012 | 0.022 | 0.035 | 0.088 | 0.110 | 0.135 |
| Functional Group Concentration (Hydroxy Groups) | | | | mmol/g | 0.031 | 0.022 | 0.021 | 0.017 | 0.009 | 0.001 |
| Carboxylic Acid Group Concentration | | | | mmol/g | 0.033 | 0.032 | 0.031 | 0.031 | 0.028 | 0.015 |
| Molecular Weight of Aliphatic Group/Number Average Molecular Weight of Thermoplastic Polyester Resin | | | | — | 0.013 | 0.013 | 0.015 | 0.023 | 0.025 | 0.025 |
| Flowability (Melt Viscosity) | | | | Pa·s | 62 | 49 | 49 | 42 | 35 | 24 |
| Mechanical Properties | Tensile Strength | | | MPa | 59 | 60 | 60 | 60 | 61 | 45 |
| | Tensile Elongation | | | % | 6.0 | 6.1 | 6.1 | 6.1 | 6.2 | 3.8 |

TABLE 4-continued

| | | Unit | | | | | |
|---|---|---|---|---|---|---|---|
| Heat Resistance (Heat Distortion Temperature) | | °C. | 162 | 172 | 172 | 178 | 171 | 165 |
| Heat Aging Resistance (Strength Retention Rate after 175° C. × 250 hours) | | % | 72 | 82 | 82 | 82 | 80 | 72 |
| High-frequency Dielectric Properties (5.8 GHz) | Relative Dielectric Constant | — | 2.76 | 2.74 | 2.74 | 2.72 | 2.70 | 2.69 |
| | Dielectric Loss Tangent | — | 0.0049 | 0.0048 | 0.0048 | 0.0048 | 0.0047 | 0.0049 |
| High-frequency Dielectric Properties (68 GHz) | Relative Dielectric Constant | — | 2.77 | 2.75 | 2.75 | 2.73 | 2.71 | 2.70 |
| | Dielectric Loss Tangent | — | 0.0050 | 0.0049 | 0.0049 | 0.0049 | 0.0048 | 0.0050 |

| | | | | Examples | | | | |
|---|---|---|---|---|---|---|---|---|
| | | | Unit | 32 | 33 | 34 | 35 | 36 |
| Dicarboxylic Acid | Terephthalic acid | | mol/% | 100 | 100 | 100 | 100 | 100 |
| Diol | Butanediol | | mol/% | 150 | 150 | 150 | 150 | 150 |
| Linear Aliphatic Alcohol | 1-Octadecanol | C18 | mol/% | | | | | |
| Branched Aliphatic Alcohol | 2-Hexyl-1-dodecanol | C18 | mol/% | | | | | |
| | 2-Decyl-1-tetradecanol | C24 | mol/% | | | | | |
| | 2-Dodecyl-1-hexadecanol | C28 | mol/% | 0.3 | 0.8 | 2.0 | 2.5 | 3.0 |
| Type of Aliphatic Group Introduced | | | — | Branched | Branched | Branched | Branched | Branched |
| Carbon Number of Aliphatic Group Introduced | | | — | 28 | 28 | 28 | 28 | 28 |
| Esterification Reaction Time | | | min | 220 | 220 | 220 | 220 | 220 |
| Polycondensation Reaction Time | | | min | 150 | 140 | 140 | 150 | 160 |
| Melting point | | | °C. | 227 | 228 | 230 | 229 | 226 |
| Functional Group Concentration (Aliphatic Groups) | | | mmol/g | 0.013 | 0.036 | 0.090 | 0.116 | 0.140 |
| Functional Group Concentration (Hydroxy Groups) | | | mmol/g | 0.049 | 0.045 | 0.015 | 0.007 | 0.001 |
| Carboxylic Acid Group Concentration | | | mmol/g | 0.031 | 0.033 | 0.032 | 0.015 | 0.011 |
| Molecular Weight of Aliphatic Group/Number Average Molecular Weight of Thermoplastic Polyester Resin | | | — | 0.018 | 0.022 | 0.027 | 0.027 | 0.030 |
| Flowability (Melt Viscosity) | | | Pa·s | 55 | 43 | 42 | 32 | 18 |
| Mechanical Properties | Tensile Strength | | MPa | 60 | 60 | 61 | 62 | 52 |
| | Tensile Elongation | | % | 6.0 | 6.0 | 6.2 | 6.3 | 4.1 |
| Heat Resistance (Heat Distortion Temperature) | | | °C. | 165 | 175 | 179 | 180 | 172 |
| Heat Aging Resistance (Strength Retention Rate after 175° C. × 250 hours) | | | % | 75 | 83 | 85 | 82 | 75 |
| High-frequency Dielectric Properties (5.8 GHz) | Relative Dielectric Constant | | — | 2.76 | 2.73 | 2.71 | 2.70 | 2.69 |
| | Dielectric Loss Tangent | | — | 0.0054 | 0.0052 | 0.0047 | 0.0045 | 0.0048 |
| High-frequency Dielectric Properties (68 GHz) | Relative Dielectric Constant | | — | 2.77 | 2.74 | 2.72 | 2.71 | 2.70 |
| | Dielectric Loss Tangent | | — | 0.0053 | 0.0053 | 0.0048 | 0.0046 | 0.0049 |

TABLE 5

| | | | | Examples | | |
|---|---|---|---|---|---|---|
| | | | Unit | 37 | 38 | 39 |
| Dicarboxylic Acid | Terephthalic Acid | | mol/% | 100 | 90 | 70 |
| | Isophthalic Acid | | mol/% | | 10 | 30 |
| | Dimethyl Terephthalate | | mol/% | | | |
| Diol | Butanediol | | mol/% | 150 | 150 | 150 |
| | Ethylene Glycol | | mol/% | | | |
| | Cyclohexanedimethanol | | mol/% | | | |
| Branched Aliphatic Alcohol | 2-Dodecyl-1-hexadecanol | C28 | mol/% | 5 | 1.5 | 1.5 |
| Type of Aliphatic Group Introduced | | | — | Branched | Branched | Branched |
| Carbon Number of Aliphatic Group Introduced | | | — | 28 | 28 | 28 |
| Esterification or Transesterification Reaction Time | | | min | 220 | 220 | 220 |
| Polycondensation Reaction Time | | | min | 150 | 140 | 140 |
| Melting point | | | °C. | 220 | 210 | 167 |
| Functional Group Concentration (Aliphatic Groups) | | | mmol/g | 0.215 | 0.070 | 0.068 |
| Functional Group Concentration (Hydroxy Groups) | | | mmol/g | 0.001 | 0.015 | 0.015 |
| Carboxylic Acid Group Concentration | | | mmol/g | 0.041 | 0.031 | 0.032 |
| Molecular Weight of Aliphatic Group/Number Average Molecular Weight of Thermoplastic Polyester Resin | | | — | 0.051 | 0.023 | 0.023 |

TABLE 5-continued

|  |  | Unit | | | |
|---|---|---|---|---|---|
| Flowability (Melt Viscosity) |  | Pa·s | 32 | 45 | 46 |
| Mechanical Properties | Tensile Strength | MPa | 21 | 55 | 54 |
|  | Tensile Elongation | % | 1.8 | 5.8 | 5.2 |
| Heat Resistance (Heat Distortion Temperature) |  | °C. | 110 | 145 | 82 |
| Heat Aging Resistance (Strength Retention Rate after 175° C. × 250 hours) |  | % | 41 | 82 | 81 |
| High-frequency Dielectric Properties (5.8 GHz) | Relative Dielectric Constant | — | 2.74 | 2.71 | 2.71 |
|  | Dielectric Loss Tangent | — | 0.0058 | 0.0042 | 0.0038 |
| High-frequency Dielectric Properties (68 GHz) | Relative Dielectric Constant | — | 2.75 | 2.72 | 2.72 |
|  | Dielectric Loss Tangent | — | 0.0059 | 0.0043 | 0.0039 |

|  |  |  | Unit | Examples | | |
|---|---|---|---|---|---|---|
|  |  |  |  | 40 | 41 | 42 |
| Dicarboxylic Acid | Terephthalic Acid |  | mol/% |  |  | 100 |
|  | Isophthalic Acid |  | mol/% |  |  |  |
|  | Dimethyl Terephthalate |  | mol/% | 100 | 100 |  |
| Diol | Butanediol |  | mol/% |  |  | 150 |
|  | Ethylene Glycol |  | mol/% | 120 | 30 |  |
|  | Cyclohexanedimethanol |  | mol/% |  | 90 |  |
| Branched Aliphatic Alcohol | 2-Dodecyl-1-hexadecanol | C28 | mol/% | 1.5 | 1.5 | 1.5 |
| Type of Aliphatic Group Introduced |  |  | — | Branched | Branched | Branched |
| Carbon Number of Aliphatic Group Introduced |  |  | — | 28 | 28 | 28 |
| Esterification or Transesterification Reaction Time |  |  | min | 220 | 220 | 220 |
| Polycondensation Reaction Time |  |  | min | 140 | 140 | 140 |
| Melting point |  |  | °C. | 252 | 269 | 230 |
| Functional Group Concentration (Aliphatic Groups) |  |  | mmol/g | 0.065 | 0.062 | 0.052 |
| Functional Group Concentration (Hydroxy Groups) |  |  | mmol/g | 0.025 | 0.023 | 0.032 |
| Carboxylic Acid Group Concentration |  |  | mmol/g | 0.034 | 0.033 | 0.032 |
| Molecular Weight of Aliphatic Group/Number Average Molecular Weight of Thermoplastic Polyester Resin |  |  | — | 0.024 | 0.023 | 0.023 |
| Flowability (Melt Viscosity) |  |  | Pa·s | 57 | 45 | 42 |
| Mechanical Properties | Tensile Strength |  | MPa | 63 | 65 | 61 |
|  | Tensile Elongation |  | % | 4.3 | 4.7 | 5.5 |
| Heat Resistance (Heat Distortion Temperature) |  |  | °C. | 172 | 184 | 175 |
| Heat Aging Resistance (Strength Retention Rate after 175° C. × 250 hours) |  |  | % | 72 | 75 | 79 |
| High-frequency Dielectric Properties (5.8 GHz) | Relative Dielectric Constant |  | — | 2.78 | 2.70 | 2.73 |
|  | Dielectric Loss Tangent |  | — | 0.0060 | 0.0059 | 0.0057 |
| High-frequency Dielectric Properties (68 GHz) | Relative Dielectric Constant |  | — | 2.79 | 2.71 | 2.74 |
|  | Dielectric Loss Tangent |  | — | 0.0061 | 0.0060 | 0.0058 |

TABLE 6

|  |  |  | Unit | Comparative Examples | | | |
|---|---|---|---|---|---|---|---|
|  |  |  |  | 5 | 6 | 7 | 8 |
| Dicarboxylic Acid | Terephthalic Acid |  | mol/% | 100 | 100 | 100 | 100 |
|  | Dimethyl Terephthalate |  | mol/% |  |  |  |  |
| Diol | Butanediol |  | mol/% | 150 | 150 | 150 | 150 |
|  | Ethylene Glycol |  | mol/% |  |  |  |  |
| Linear Aliphatic Alcohol | Butanol | C4 | mol/% |  | 1.5 |  |  |
|  | Octanol | C8 | mol/% |  |  | 1.5 |  |
| Branched Aliphatic Alcohol | 2-Ethyl-1-hexanol | C8 | mol/% |  |  |  | 1.5 |
|  | 2-Dodecyl-1-hexadecanol | C28 | mol/% |  |  |  |  |
| Alicyclic Carboxylic Acid | 1-Octadecanoic Acid | C18 | mol/% |  |  |  |  |
| Other Monomer | MPEG | — | mol/% |  |  |  |  |
| Type of Aliphatic Group Introduced |  |  | — | — | Linear | Linear | Branched |
| Carbon Number of Aliphatic Group Introduced |  |  | — | — | 4 | 8 | 8 |
| Esterification Reaction Time |  |  | min | 220 | 220 | 220 | 220 |
| Polycondensation Reaction Time |  |  | min | 110 | 110 | 110 | 130 |
| Melting point |  |  | °C. | 225 | 225 | 224 | 224 |
| Functional Group Concentration (Aliphatic Groups) |  |  | mmol/g | 0 | 0.004 | 0.010 | 0.009 |
| Functional Group Concentration (Hydroxy Groups) |  |  | mmol/g | 0.095 | 0.091 | 0.072 | 0.073 |
| Carboxylic Acid Group Concentration |  |  | mmol/g | 0.021 | 0.025 | 0.027 | 0.028 |
| Molecular Weight of Aliphatic Group/Number Average Molecular Weight of Thermoplastic Polyester Resin |  |  | — | 0.000 | 0.003 | 0.006 | 0.006 |
| Flowability (Melt Viscosity) |  |  | Pa·s | 120 | 115 | 112 | 110 |
| Mechanical Properties | Tensile Strength |  | MPa | 58 | 57 | 57 | 58 |
|  | Tensile Elongation |  | % | 5.4 | 5.2 | 5.3 | 5.3 |
| Heat Resistance (Heat Distortion Temperature) |  |  | °C. | 160 | 160 | 158 | 154 |
| Heat Aging Resistance (Strength Retention Rate after 175° C. × 250 hours) |  |  | % | 72 | 75 | 74 | 75 |
| High-frequency Dielectric Properties (5.8 GHz) | Relative Dielectric Constant |  | — | 2.78 | 2.78 | 2.77 | 2.79 |
|  | Dielectric Loss Tangent |  | — | 0.0079 | 0.0072 | 0.0072 | 0.0071 |

TABLE 6-continued

| | | | | | | | |
|---|---|---|---|---|---|---|---|
| High-frequency Dielectric Properties (68 GHz) | Relative Dielectric Constant | | — | 2.79 | 2.79 | 2.78 | 2.80 |
| | Dielectric Loss Tangent | | — | 0.0099 | 0.0092 | 0.0092 | 0.0091 |

| | | | | Comparative Examples | | | |
|---|---|---|---|---|---|---|---|
| | | | Unit | 9 | 10 | 11 | 12 |
| Dicarboxylic Acid | Terephthalic Acid | | mol/% | 100 | 100 | 100 | |
| | Dimethyl Terephthalate | | mol/% | | | | 100 |
| Diol | Butanediol | | mol/% | 150 | 150 | 150 | |
| | Ethylene Glycol | | mol/% | | | | 150 |
| LinearAliphatic Alcohol | Butanol | C4 | mol/% | | | | |
| | Octanol | C8 | mol/% | | | | |
| Branched Aliphatic Alcohol | 2-Ethyl-1-hexanol | C8 | mol/% | | | | |
| | 2-Dodecyl-1-hexadecanol | C28 | mol/% | | | 0.05 | |
| Alicyclic Carboxylic Acid | 1-Octadecanoic Acid | C18 | mol/% | 1.5 | | | |
| Other Monomer | MPEG | — | mol/% | | 1.5 | | |
| Type of Aliphatic Group Introduced | | | — | Linear | — | Branched | — |
| Carbon Number of Aliphatic Group Introduced | | | — | 18 | — | 28 | — |
| Esterification Reaction Time | | | min | 240 | 220 | 220 | 220 |
| Polycondensation Reaction Time | | | min | 170 | 120 | 110 | 200 |
| Melting point | | | °C. | 224 | 226 | 226 | 250 |
| Functional Group Concentration (Aliphatic Groups) | | | mmol/g | 0.061 | 0 | 0.002 | 0 |
| Functional Group Concentration (Hydroxy Groups) | | | mmol/g | 0.066 | 0.052 | 0.085 | 0.082 |
| Carboxylic Acid Group Concentration | | | mmol/g | 0.015 | 0.021 | 0.028 | 0.031 |
| Molecular Weight of Aliphatic Group/Number Average Molecular Weight of Thermoplastic Polyester Resin | | | — | 0.018 | 0.000 | 0.023 | 0.000 |
| Flowability (Melt Viscosity) | | | Pa·s | 85 | 65 | 105 | 145 |
| Mechanical Properties | Tensile Strength | | MPa | 52 | 45 | 55 | 61 |
| | Tensile Elongation | | % | 4.9 | 3.9 | 5.4 | 4.1 |
| Heat Resistance (Heat Distortion Temperature) | | | °C. | 145 | 156 | 160 | 168 |
| Heat Aging Resistance (Strength Retention Rate after 175°C. × 250 hours) | | | % | 62 | 33 | 76 | 65 |
| High-frequency Dielectric Properties (5.8 GHz) | Relative Dielectric Constant | | — | 2.75 | 2.92 | 2.78 | 2.81 |
| | Dielectric Loss Tangent | | — | 0.0069 | 0.0130 | 0.0075 | 0.0087 |
| High-frequency Dielectric Properties (68 GHz) | Relative Dielectric Constant | | — | 2.77 | 2.93 | 2.79 | 2.82 |
| | Dielectric Loss Tangent | | — | 0.0102 | 0.0150 | 0.0095 | 0.0107 |

TABLE 7

| | | | | Examples | | | | |
|---|---|---|---|---|---|---|---|---|
| | | Symbol | Unit | 43 | 44 | 45 | 46 | 47 |
| Thermoplastic Polyester Resin | Thermoplastic Polyester Resin of Example 1 | — | part(s) by weight | | | | 100 | |
| | Thermoplastic Polyester Resin of Example 12 | — | part(s) by weight | 100 | 100 | 100 | | 100 |
| | Thermoplastic Polyester Resin of Example 33 | — | part(s) by weight | | | | | |
| | Thermoplastic Polyester Resin of Comparative Example 1 | — | part(s) by weight | | | | | |
| Thermoplastic Resin (B) | Linear low density polyethylene resin | B-1 | part(s) by weight | 10 | | | | |
| | Polystyrene Resin | B-2 | part(s) by weight | | | | | |
| | Polycarbonate Resin | B-3 | part(s) by weight | | | | 20 | |
| Compound Having Reactive Functional Group (C) | Ethylene-Glycidyl Methacrylate Copolymer | C-1 | part(s) by weight | 10 | | | | |
| | Epoxide of Styrene-Butadiene Block Copolymer | C-2 | part(s) by weight | | | | | |
| | Maleic Anhydride-denatured Polypropylene | C-3 | part(s) by weight | | | 20 | | |
| Inorganic Filler (D) | Glass Fiber | D-1 | part(s) by weight | | | | 43 | 43 |
| | Glass Fiber | D-2 | part(s) by weight | | | | | |
| Mechanical Properties | Tensile Strength | | MPa | 52 | 55 | 61 | 137 | 140 |
| | Tensile Elongation | | % | 15.0 | 12.0 | 14.0 | 2.9 | 3.0 |
| Heat Resistance | Heat Distortion Temperature | | °C. | 151 | 162 | 165 | 200 | 204 |

TABLE 7-continued

| | | | | | | | |
|---|---|---|---|---|---|---|---|
| Low Warpage Properties | Amount of Warpage | mm | 2.0 | 2.0 | 1.5 | 2.2 | 1.9 |
| High-frequency Dielectric Properties (5.8 GHz) | Relative Dielectric Constant | — | 2.61 | 2.58 | 2.78 | 3.37 | 3.32 |
| | Dielectric Loss Tangent | — | 0.0041 | 0.0038 | 0.0045 | 0.0068 | 0.0065 |

| | | | | Examples | | | |
|---|---|---|---|---|---|---|---|
| | | Symbol | Unit | 48 | 49 | 50 | 51 |
| Thermoplastic Polyester Resin | Thermoplastic Polyester Resin of Example 1 | — | part(s) by weight | | | | |
| | Thermoplastic Polyester Resin of Example 12 | — | part(s) by weight | | 100 | 100 | 100 |
| | Thermoplastic Polyester Resin of Example 33 | — | part(s) by weight | 100 | | | |
| | Thermoplastic Polyester Resin of Comparative Example 1 | — | part(s) by weight | | | | |
| Thermoplastic Resin (B) | Linear low density polyethylene resin | B-1 | part(s) by weight | | | | |
| | Polystyrene Resin | B-2 | part(s) by weight | | | | |
| | Polycarbonate Resin | B-3 | part(s) by weight | | | | |
| Compound Having Reactive Functional Group (C) | Ethylene-Glycidyl Methacrylate Copolymer | C-1 | part(s) by weight | | | | |
| | Epoxide of Styrene-Butadiene Block Copolymer | C-2 | part(s) by weight | | | | |
| | Maleic Anhydride-denatured Polypropylene | C-3 | part(s) by weight | | | | |
| Inorganic Filler (D) | Glass Fiber | D-1 | part(s) by weight | 43 | 54 | 25 | |
| | Glass Fiber | D-2 | part(s) by weight | | | | 43 |
| Mechanical Properties | Tensile Strength | MPa | | 138 | 150 | 111 | 142 |
| | Tensile Elongation | % | | 2.9 | 2.5 | 3.4 | 3.1 |
| Heat Resistance | Heat Distortion Temperature | °C. | | 204 | 208 | 177 | 205 |
| Low Warpage Properties | Amount of Warpage | mm | | 1.8 | 1.8 | 2.4 | 1.9 |
| High-frequency Dielectric Properties (5.8 GHz) | Relative Dielectric Constant | — | | 3.35 | 3.45 | 3.11 | 2.96 |
| | Dielectric Loss Tangent | — | | 0.0066 | 0.0070 | 0.0059 | 0.0047 |

TABLE 8

| | | | | Examples | | | |
|---|---|---|---|---|---|---|---|
| | | Symbol | Unit | 52 | 53 | 54 | 55 |
| Thermoplastic Polyester Resin | Thermoplastic Polyester Resin of Example 1 | — | part(s) by weight | | | | |
| | Thermoplastic Polyester Resin of Example 12 | — | part(s) by weight | 100 | 100 | 100 | 100 |
| | Thermoplastic Polyester Resin of Example 33 | — | part(s) by weight | | | | |
| | Thermoplastic Polyester Resin of Comparative Example 1 | — | part(s) by weight | | | | |
| Thermoplastic Resin (B) | Linear low density polyethylene resin | B-1 | part(s) by weight | 23.6 | | | |
| | Polystyrene Resin | B-2 | part(s) by weight | | 23.6 | | |
| | Polycarbonate Resin | B-3 | part(s) by weight | | | 23.6 | |
| Reactive Compound (C) | Ethylene-Glycidyl Methacrylate Copolymer | C-1 | part(s) by weight | 3.6 | | | |
| | Epoxide of Styrene-Butadiene Block Copolymer | C-2 | part(s) by weight | | 3.6 | 3.6 | |
| | Maleic Anhydride-denatured Polypropylene | C-3 | part(s) by weight | | | | |
| Inorganic Filler (D) | Glass Fiber | D-1 | part(s) by weight | 54 | 54 | 54 | 86 |
| | Glass Fiber | D-2 | part(s) by weight | | | | |

TABLE 8-continued

| | | | Symbol | Unit | | | | |
|---|---|---|---|---|---|---|---|---|
| Other Additive (E) | Organic Phosphonium Salt | | E-1 | part(s) by weight | 0.5 | 0.5 | 0.5 | |
| Mechanical Properties | Tensile Strength | | | MPa | 116 | 133 | 128 | 140 |
| | Tensile Elongation | | | % | 2.7 | 2.3 | 3.1 | 2.9 |
| Heat Resistance | Heat Distortion Temperature | | | ° C. | 187 | 195 | 182 | 209 |
| Low Warpage Properties | Amount of Warpage | | | mm | 2.6 | 1.2 | 1.4 | 4.3 |
| High-frequency Dielectric Properties (5.8 GHz) | Relative Dielectric Constant | | | — | 3.14 | 3.20 | 3.27 | 3.36 |
| | Dielectric Loss Tangent | | | — | 0.0053 | 0.0054 | 0.0063 | 0.0075 |

| | | | | | Examples | | Comparative Example |
|---|---|---|---|---|---|---|---|
| | | | Symbol | Unit | 56 | 57 | 13 |
| Thermoplastic Polyester Resin | Thermoplastic Polyester Resin of Example 1 | — | part(s) by weight | | | | |
| | Thermoplastic Polyester Resin of Example 12 | — | part(s) by weight | | 100 | 100 | |
| | Thermoplastic Polyester Resin of Example 33 | — | part(s) by weight | | | | |
| | Thermoplastic Polyester Resin of Comparative Example 1 | — | part(s) by weight | | | | 100 |
| Thermoplastic Resin (B) | Linear low density polyethylene resin | B-1 | part(s) by weight | | | | |
| | Polystyrene Resin | B-2 | part(s) by weight | | | | |
| | Polycarbonate Resin | B-3 | part(s) by weight | | | | |
| Reactive Compound (C) | Ethylene-Glycidyl Methacrylate Copolymer | C-1 | part(s) by weight | | | | |
| | Epoxide of Styrene-Butadiene Block Copolymer | C-2 | part(s) by weight | | | | |
| | Maleic Anhydride-denatured Polypropylene | C-3 | part(s) by weight | | | | |
| Inorganic Filler (D) | Glass Fiber | D-1 | part(s) by weight | | 108 | 1 | 43 |
| | Glass Fiber | D-2 | part(s) by weight | | | | |
| Other Additive (E) | Organic Phosphonium Salt | E-1 | part(s) by weight | | | | |
| Mechanical Properties | Tensile Strength | | MPa | | 155 | 60 | 142 |
| | Tensile Elongation | | % | | 2.1 | 6.0 | 3.0 |
| Heat Resistance | Heat Distortion Temperature | | ° C. | | 210 | 178 | 205 |
| Low Warpage Properties | Amount of Warpage | | mm | | 1.5 | 5.6 | 3.8 |
| High-frequency Dielectric Properties (5.8 GHz) | Relative Dielectric Constant | | — | | 3.98 | 2.73 | 3.83 |
| | Dielectric Loss Tangent | | — | | 0.0084 | 0.0048 | 0.0091 |

A comparison of Examples 1 to 42 with Comparative Examples 1 to 12 revealed that the thermoplastic polyester resins in which the hydroxy group concentration as measured by $^1$H-NMR is 0.050 mmol/g or less, have excellent mechanical properties and heat resistance as well as excellent high-frequency dielectric properties.

A comparison of Examples 12 and 38 with Example 39 revealed that the thermoplastic polyester resins having a melting point of 180° C. or higher have an excellent heat resistance.

A comparison of Examples 6 to 36 with Example 37, Comparative Examples 5 to 9 and 11 revealed that, when the thermoplastic polyester resins have an aliphatic group having 10 to 50 carbon atoms at a molecular end thereof, and the functional group concentration of the aliphatic group is a specific amount, the resins have excellent mechanical properties, flowability, heat resistance, heat aging resistance and high-frequency dielectric properties.

A comparison of Examples 6, 7, 9 to 13 with Example 8 revealed that, when the aliphatic group at the molecular end is an aliphatic group having 16 to 36 carbon atoms, the thermoplastic polyester resins have a more excellent flowability, heat resistance and high-frequency dielectric properties.

A comparison of Examples 9 to 13 with Examples 6, 7 and 14 revealed that, when the aliphatic group at the molecular end is a branched saturated aliphatic group having 10 to 50 carbon atoms, the thermoplastic polyester resins have a more excellent flowability, heat resistance, heat aging resistance and high-frequency dielectric properties.

A comparison of Example 12 with Examples 40 and 41 revealed that, when the thermoplastic polyester resin is a polybutylene terephthalate resin, the resin has a more excellent flowability and high-frequency dielectric properties.

A comparison of Examples 6 and 9 with Comparative Example 9 revealed that the thermoplastic polyester resins obtained by a production method including adding an aliphatic alcohol having 10 to 50 carbon atoms, in the step of any one reaction selected from the group consisting of an esterification reaction, a transesterification reaction and a polycondensation reaction, of the aromatic dicarboxylic acid or an ester-forming derivative thereof and the diol or an ester-forming derivative thereof, in the polymerization step of the thermoplastic polyester resin, have more excellent mechanical properties, flowability and high-frequency dielectric properties.

A comparison of Example 12 with Example 42 revealed that the thermoplastic polyester resin obtained by the production method in which an aliphatic alcohol having 10 to 50 carbon atoms is added at an arbitrary stage in either the esterification reaction or the transesterification reaction, has more excellent flowability and high-frequency dielectric properties.

A comparison of Example 44 with Example 12 revealed that the thermoplastic polyester resin composition comprising 10 to 150 parts by weight of the thermoplastic resin (B) having a dielectric loss tangent at a frequency of 5.8 GHz, as measured by the cylindrical cavity resonator perturbation method, of 0.005 or less, has excellent mechanical properties and heat resistance as well as excellent high-frequency dielectric properties.

A comparison of Examples 43 and 44 with Example 12 revealed that the thermoplastic polyester resin compositions comprising 1 to 50 parts by weight of the reactive compound (C) have excellent mechanical properties as well as excellent high-frequency dielectric properties.

A comparison of Examples 46 to 50 with Examples 55, 57 and Comparative Example 13 revealed that the thermoplastic polyester resin compositions comprising 1 to 100 parts by weight of the inorganic filler (D) are capable of providing high levels of mechanical properties, heat resistance, low warpage properties and high-frequency dielectric properties in a balanced manner.

Further, a comparison of Example 47 with Example 51 revealed that the incorporation of the glass fiber having excellent low dielectric properties as the inorganic filler (D) leads to more excellent high-frequency dielectric properties.

The invention claimed is:

1. A thermoplastic polyester resin comprising a residue of an aromatic dicarboxylic acid or an ester-forming derivative thereof and a residue of a diol or an ester-forming derivative thereof, as main structural units, wherein an aliphatic group having 10 to 50 carbon atoms have been introduced into a part of a molecular end of the thermoplastic polyester resin, the functional group concentration of the aliphatic group is 0.005 mmol/g or more and less than 0.20 mmol/g, the hydroxy group concentration determined from an integral ratio of peaks attributed to end groups, as measured by 1H-NMR using heavy hexafluoroisopropanol as a solvent, is 0.050 mmol/g or less, and a dielectric loss tangent at 5.8 GHz, as measured by a cylindrical cavity resonator perturbation method at 23° C., is 0.0060 or less.

2. The thermoplastic polyester resin according to claim 1, wherein said thermoplastic polyester resin has a melting point of 180° C. or higher.

3. The thermoplastic polyester resin according to claim 1, wherein said aliphatic group having 10 to 50 carbon atoms is an aliphatic group having 20 to 50 carbon atoms.

4. The thermoplastic polyester resin according to claim 1, wherein said aliphatic group is an aliphatic group having 16 to 36 carbon atoms.

5. The thermoplastic polyester resin according to claim 1, wherein said aliphatic group is a branched saturated aliphatic group having 10 to 50 carbon atoms.

6. The thermoplastic polyester resin according to claim 1, wherein a ratio ((a molecular weight of said aliphatic group)/(a number average molecular weight of said thermoplastic polyester resin)) of the molecular weight of said aliphatic group to the number average molecular weight of said thermoplastic polyester resin is 0.001 to 0.10.

7. The thermoplastic polyester resin according to claim 1, wherein said thermoplastic polyester resin is a polybutylene terephthalate resin.

8. A method of producing the thermoplastic polyester resin according to claim 1, the method comprising adding an aliphatic alcohol having 10 to 50 carbon atoms, in a step of any one reaction selected from the group consisting of an esterification reaction, a transesterification reaction and a polycondensation reaction, of said aromatic dicarboxylic acid or an ester-forming derivative thereof and said diol or an ester-forming derivative thereof, in the polymerization step of said thermoplastic polyester resin.

9. A thermoplastic polyester resin composition comprising:
  the thermoplastic polyester resin according to claim 1; and
  10 to 150 parts by weight of a thermoplastic resin (B) having a dielectric loss tangent at a frequency of 5.8 GHz, as measured by the cylindrical cavity resonator perturbation method, of 0.005 or less, with respect to 100 parts by weight of said thermoplastic polyester resin.

10. A molded article obtained by melt molding the thermoplastic polyester resin composition according to claim 9.

11. A high-frequency transmission part comprising the molded article according to claim 10.

12. A metal composite molded article in which the molded article according to claim 10 and a metal part are integrated.

13. A thermoplastic polyester resin composition comprising:
  the thermoplastic polyester resin according to claim 1; and
  1 to 50 parts by weight of a reactive compound (C) having at least one reactive functional group selected from the group consisting of an epoxy group, an acid anhydride group, an oxazoline group, an isocyanate group and a carbodiimide group, with respect to 100 parts by weight of said thermoplastic polyester resin.

14. A thermoplastic polyester resin composition comprising:
  the thermoplastic polyester resin according to claim 1; and
  1 to 100 parts by weight of an inorganic filler (D), with respect to 100 parts by weight of said thermoplastic polyester resin.

15. A molded article obtained by melt molding the thermoplastic polyester resin according to claim 1.

16. A high-frequency transmission part comprising the molded article according to claim 15.

17. A metal composite molded article in which the molded article according to claim 15 and a metal part are integrated.

* * * * *